US011975317B2

(12) United States Patent
Snydacker et al.

(10) Patent No.: US 11,975,317 B2
(45) Date of Patent: May 7, 2024

(54) ION EXCHANGE REACTOR WITH PARTICLE TRAPS FOR LITHIUM EXTRACTION

(71) Applicant: Lilac Solutions, Inc., Oakland, CA (US)

(72) Inventors: David Henry Snydacker, San Francisco, CA (US); Alexander John Grant, San Francisco, CA (US)

(73) Assignee: LILAC SOLUTIONS, INC., Oakland, CA (US)

( * ) Notice: Subject to any disclaimer, the term of this patent is extended or adjusted under 35 U.S.C. 154(b) by 0 days.

(21) Appl. No.: 18/477,278

(22) Filed: Sep. 28, 2023

(65) Prior Publication Data

US 2024/0017250 A1    Jan. 18, 2024

Related U.S. Application Data

(63) Continuation of application No. 16/970,238, filed as application No. PCT/US2019/019780 on Feb. 27, 2019, now Pat. No. 11,826,747.

(60) Provisional application No. 62/636,766, filed on Feb. 28, 2018.

(51) Int. Cl.
*B01J 47/022* (2017.01)
*C22B 3/42* (2006.01)
*C22B 26/12* (2006.01)

(52) U.S. Cl.
CPC .............. *B01J 47/022* (2013.01); *C22B 3/42* (2013.01); *C22B 26/12* (2013.01); *B01J 2220/445* (2013.01)

(58) Field of Classification Search
CPC .... B01J 47/022; B01J 2220/445; B01J 47/00; C22B 26/12; C22B 3/42; B01D 36/00; B01D 37/00; B01D 39/00
See application file for complete search history.

(56) References Cited

U.S. PATENT DOCUMENTS

| | | |
|---|---|---|
| 2,608,465 A | 8/1952 | Henderson |
| 2,609,341 A * | 9/1952 | Juda .................. B01J 49/06 210/678 |
| 3,207,577 A | 9/1965 | Mizuma |
| 3,793,433 A | 2/1974 | Seeley et al. |
| 3,920,544 A | 11/1975 | Weiss |
| 4,058,585 A * | 11/1977 | MacKay ............. C01G 3/00 423/100 |
| 4,116,858 A | 9/1978 | Lee et al. |
| 4,159,311 A | 6/1979 | Bauman et al. |
| 4,291,001 A | 9/1981 | Repsher et al. |
| 4,347,327 A * | 8/1982 | Lee ................ C01D 15/00 423/179.5 |
| 4,382,124 A | 5/1983 | Meitzner et al. |
| 4,665,049 A | 5/1987 | Miyai et al. |
| 4,747,949 A | 5/1988 | Barkey |
| 5,039,382 A | 8/1991 | Suzuki et al. |
| 5,242,119 A | 9/1993 | Jariyasunant |
| 5,626,750 A * | 5/1997 | Chinn .................. B01J 47/022 210/275 |
| 5,639,861 A | 6/1997 | Steffier |
| 6,048,507 A | 4/2000 | Amouzegar et al. |
| 6,171,489 B1 | 1/2001 | Ballard et al. |
| 6,207,126 B1 | 3/2001 | Boryta et al. |
| 6,325,976 B1 | 12/2001 | Small et al. |
| 6,749,648 B1 | 6/2004 | Kumar et al. |
| 7,390,466 B2 | 6/2008 | Boryta et al. |
| 7,435,477 B2 | 10/2008 | Adachi et al. |
| 7,541,016 B2 | 6/2009 | Gorshkov et al. |
| 7,820,327 B2 | 10/2010 | Yumoto et al. |
| 8,454,816 B1 | 6/2013 | Harrison et al. |
| 8,506,851 B2 | 8/2013 | Ravet et al. |
| 8,574,519 B2 | 11/2013 | Harrison et al. |
| 8,679,224 B2 | 3/2014 | Brown et al. |
| 8,741,150 B2 | 6/2014 | Chung et al. |
| 8,778,289 B2 | 7/2014 | Chon et al. |
| 8,926,874 B2 | 1/2015 | Chung et al. |
| 9,034,294 B1 | 5/2015 | Harrison |
| 9,598,291 B2 | 3/2017 | Chon et al. |
| 9,677,181 B2 | 6/2017 | Bourassa et al. |
| 9,795,943 B2 | 10/2017 | Chung et al. |
| 9,994,931 B2 | 6/2018 | Chon et al. |
| 10,017,838 B2 | 7/2018 | Chon et al. |
| 10,056,656 B2 | 8/2018 | Song |
| 10,150,056 B2 | 12/2018 | Snydacker |
| 10,322,950 B2 | 6/2019 | Snydacker et al. |
| 10,336,624 B2 | 7/2019 | Song |

(Continued)

FOREIGN PATENT DOCUMENTS

| | | |
|---|---|---|
| AR | 092617 A1 | 4/2015 |
| CN | 87103431 A | 11/1987 |

(Continued)

OTHER PUBLICATIONS

Alberti et al. Crystalline insoluble acid salts of tetravalent metals—IX: Thorium arsenate, a new inorganic ion exchanger specific for lithium. Journal of Inorganic and Nuclear Chemistry 32:1719-1727 (1970).

(Continued)

*Primary Examiner* — Timothy C Vanoy
(74) *Attorney, Agent, or Firm* — WILSON SONSINI GOODRICH & ROSATI

(57) ABSTRACT

The present invention relates to the extraction of lithium from liquid resources such as natural and synthetic brines, leachate solutions from clays and minerals, and recycled products.

29 Claims, 9 Drawing Sheets

(56) References Cited

U.S. PATENT DOCUMENTS

| | | | |
|---|---|---|---|
| 10,392,258 B2 | 8/2019 | Song | |
| 10,439,200 B2 | 10/2019 | Snydacker et al. | |
| 10,478,751 B2 | 11/2019 | Chung et al. | |
| 10,505,178 B2 | 12/2019 | Snydacker et al. | |
| 10,604,414 B2 | 3/2020 | Featherstone et al. | |
| 10,648,090 B2 | 5/2020 | Snydacker et al. | |
| 10,695,694 B2 | 6/2020 | Snydacker | |
| 11,253,848 B2 | 2/2022 | Snydacker | |
| 11,339,457 B2 | 5/2022 | Snydacker | |
| 11,358,875 B2 | 6/2022 | Snydacker et al. | |
| 11,365,128 B2 | 6/2022 | Marston et al. | |
| 11,377,362 B2 | 7/2022 | Snydacker et al. | |
| 11,583,830 B2 | 2/2023 | Brown | |
| 11,638,916 B1 | 5/2023 | Jones | |
| 2003/0231996 A1 | 12/2003 | Shiu et al. | |
| 2004/0005267 A1 | 1/2004 | Boryta et al. | |
| 2005/0139549 A1 | 6/2005 | Yoshida et al. | |
| 2005/0196370 A1 | 9/2005 | Yu et al. | |
| 2007/0138020 A1 | 6/2007 | Balagopal et al. | |
| 2009/0013829 A1 | 1/2009 | Harris et al. | |
| 2010/0116748 A1 | 5/2010 | Rasmussen et al. | |
| 2011/0044882 A1 | 2/2011 | Buckley et al. | |
| 2011/0067230 A1 | 3/2011 | Tan et al. | |
| 2011/0174739 A1 | 7/2011 | Chung et al. | |
| 2011/0203929 A1 | 8/2011 | Buckley et al. | |
| 2013/0001168 A1 | 1/2013 | Kim et al. | |
| 2013/0306565 A1 | 11/2013 | Davis | |
| 2014/0113197 A1 | 4/2014 | Xiao et al. | |
| 2014/0239221 A1 | 8/2014 | Harrison et al. | |
| 2015/0013499 A1 | 1/2015 | Asano et al. | |
| 2015/0083667 A1 | 3/2015 | Stouffer | |
| 2015/0152523 A1 | 6/2015 | Sharma | |
| 2015/0197830 A1 | 7/2015 | Chon et al. | |
| 2015/0203542 A1 | 7/2015 | Bagnoli et al. | |
| 2015/0258501 A1 | 9/2015 | Chung et al. | |
| 2016/0115040 A1 | 4/2016 | Yi et al. | |
| 2016/0161453 A1 | 6/2016 | De | |
| 2016/0230250 A1 | 8/2016 | Chung et al. | |
| 2016/0289154 A1 | 10/2016 | Scates et al. | |
| 2017/0022617 A1 | 1/2017 | Magnan et al. | |
| 2017/0028395 A1 | 2/2017 | Bewsey | |
| 2017/0175228 A1 | 6/2017 | Hunwick | |
| 2017/0189855 A1 | 7/2017 | Xiang et al. | |
| 2017/0217796 A1* | 8/2017 | Snydacker | B01J 20/28033 |
| 2017/0233261 A1 | 8/2017 | Sharma | |
| 2017/0339286 A1 | 11/2017 | Kogure | |
| 2018/0016153 A1 | 1/2018 | Sharma | |
| 2018/0080133 A1 | 3/2018 | Smith | |
| 2018/0133619 A1 | 5/2018 | Snydacker | |
| 2018/0222760 A1 | 8/2018 | Reed | |
| 2018/0245180 A1 | 8/2018 | Cheng et al. | |
| 2018/0304202 A1 | 10/2018 | Kariveti | |
| 2018/0318755 A1 | 11/2018 | Aines et al. | |
| 2018/0339286 A1 | 11/2018 | Bazzi et al. | |
| 2019/0024212 A1* | 1/2019 | Lien | C22B 26/12 |
| 2019/0044126 A1 | 2/2019 | Snydacker et al. | |
| 2019/0062207 A1 | 2/2019 | Jin | |
| 2019/0225854 A1 | 7/2019 | Harrison et al. | |
| 2019/0233297 A1 | 8/2019 | Kim et al. | |
| 2019/0248667 A1 | 8/2019 | Featherstone et al. | |
| 2019/0256987 A1 | 8/2019 | Snydacker et al. | |
| 2019/0273245 A1 | 9/2019 | Snydacker et al. | |
| 2019/0276327 A1 | 9/2019 | Brown | |
| 2020/0165699 A1 | 5/2020 | Snydacker et al. | |
| 2020/0189925 A1 | 6/2020 | Featherstone et al. | |
| 2020/0232105 A1 | 7/2020 | Snydacker et al. | |
| 2020/0289958 A1 | 9/2020 | Snydacker | |
| 2020/0298207 A1 | 9/2020 | Brown | |
| 2020/0399137 A1 | 12/2020 | Harrison | |
| 2021/0077990 A1 | 3/2021 | Snydacker et al. | |
| 2021/0206651 A1 | 7/2021 | Napier et al. | |
| 2021/0222270 A1 | 7/2021 | Napier et al. | |
| 2021/0300774 A1 | 9/2021 | Kim et al. | |
| 2021/0346822 A1 | 11/2021 | Ireland | |
| 2021/0380429 A1 | 12/2021 | Snydacker et al. | |
| 2022/0121470 A1 | 4/2022 | Saxena et al. | |
| 2022/0194796 A1 | 6/2022 | Kim et al. | |
| 2022/0212184 A1 | 7/2022 | Snydacker | |
| 2022/0235436 A1 | 7/2022 | Snydacker | |
| 2022/0290272 A1 | 9/2022 | Kölbel et al. | |
| 2022/0340440 A1 | 10/2022 | Wang | |
| 2022/0348475 A1 | 11/2022 | Snydacker et al. | |
| 2022/0349027 A1 | 11/2022 | Snydacker et al. | |
| 2022/0372594 A1 | 11/2022 | Chon | |
| 2023/0019776 A1 | 1/2023 | Bishkin | |
| 2023/0047281 A1 | 2/2023 | Bhattacharyya et al. | |
| 2023/0064968 A1 | 3/2023 | Smith et al. | |
| 2023/0079295 A1 | 3/2023 | Matsumoto et al. | |
| 2023/0381687 A1 | 11/2023 | Grosso et al. | |
| 2023/0405492 A1 | 12/2023 | Snydacker | |
| 2024/0018008 A1 | 1/2024 | Snydacker et al. | |
| 2024/0026495 A1 | 1/2024 | Snydacker et al. | |

FOREIGN PATENT DOCUMENTS

| | | | |
|---|---|---|---|
| CN | 101764209 A | 6/2010 | |
| CN | 101961634 A | 2/2011 | |
| CN | 102872792 A | 1/2013 | |
| CN | 103276406 A | 9/2013 | |
| CN | 103794779 A | 5/2014 | |
| CN | 104577243 A | 4/2015 | |
| CN | 105238927 A | 1/2016 | |
| CN | 105251436 A | 1/2016 | |
| CN | 105289455 A | 2/2016 | |
| CN | 205151853 U | 4/2016 | |
| CN | 105 555 978 A * | 5/2016 | C25C 1/22 |
| CN | 106311190 A | 1/2017 | |
| CN | 106 622 103 A * | 5/2017 | B01J 20/046 |
| CN | 106673023 A | 5/2017 | |
| CN | 107043116 A | 8/2017 | |
| CN | 209123481 U | 7/2019 | |
| DE | 102016212048 A1 | 1/2018 | |
| EP | 0 551 002 A1 * | 7/1993 | B01J 47/02 |
| EP | 2945211 B1 | 11/2018 | |
| FR | 3034781 A1 | 10/2016 | |
| JP | H0626661 B2 | 4/1994 | |
| JP | H08236114 A | 9/1996 | |
| JP | 2002167626 A | 6/2002 | |
| JP | 2003500318 A | 1/2003 | |
| JP | 2004230215 A | 8/2004 | |
| JP | 2005296811 A | 10/2005 | |
| JP | 2006159039 A | 6/2006 | |
| JP | 2009507839 A | 2/2009 | |
| JP | 2010042395 A | 2/2010 | |
| JP | 2014055312 A | 3/2014 | |
| JP | 2015020090 A | 2/2015 | |
| JP | 5898021 B2 | 4/2016 | |
| JP | 2017131863 A | 8/2017 | |
| JP | 2018535309 A | 11/2018 | |
| JP | 2019099874 A | 6/2019 | |
| KR | 20120015658 A | 2/2012 | |
| KR | 20120063424 A | 6/2012 | |
| KR | 20140082065 A | 7/2014 | |
| KR | 20160126314 A | 11/2016 | |
| WO | WO-2010035956 A2 | 4/2010 | |
| WO | WO-2010056322 A1 | 5/2010 | |
| WO | WO-2010103173 A1 | 9/2010 | |
| WO | WO-2011133165 A1 | 10/2011 | |
| WO | WO-2012005545 A2 | 1/2012 | |
| WO | WO-2014047347 A1 | 3/2014 | |
| WO | WO-2015121684 A1 | 8/2015 | |
| WO | WO-2015123762 A1 | 8/2015 | |
| WO | WO-2015171109 A1 | 11/2015 | |
| WO | WO-2016064689 A2 | 4/2016 | |
| WO | WO-2016172017 A1 | 10/2016 | |
| WO | WO-2017005113 A1 | 1/2017 | |
| WO | WO-2017020090 A1 | 2/2017 | |
| WO | WO-2017039724 A1 | 3/2017 | |
| WO | WO-2017136328 A1 | 8/2017 | |
| WO | WO-2017137885 A1 | 8/2017 | |
| WO | WO-2018089932 A1 | 5/2018 | |
| WO | WO-2018129949 A1 | 7/2018 | |
| WO | WO-2019000095 A1 | 1/2019 | |
| WO | WO-2019028148 A1 | 2/2019 | |

(56) References Cited

FOREIGN PATENT DOCUMENTS

| WO | WO-2019028174 A2 | 2/2019 |
|---|---|---|
| WO | WO-2019126862 A1 | 7/2019 |
| WO | WO-2019160982 A1 | 8/2019 |
| WO | WO-2019168941 A1 | 9/2019 |
| WO | WO-2021142147 A1 | 7/2021 |
| WO | WO-2021204375 A1 | 10/2021 |
| WO | WO-2021212214 A1 | 10/2021 |
| WO | WO-2021252381 A1 | 12/2021 |
| WO | WO-2022084145 A1 | 4/2022 |
| WO | WO-2022109156 A1 | 5/2022 |
| WO | WO-2022226219 A1 | 10/2022 |
| WO | WO-2022260542 A1 | 12/2022 |
| WO | WO-2023081448 A1 | 5/2023 |
| WO | WO-2023192192 A1 | 10/2023 |
| WO | WO-2023192195 A1 | 10/2023 |
| WO | WO-2023192623 A2 | 10/2023 |
| WO | WO-2023205073 A1 | 10/2023 |
| WO | WO-2023215313 A1 | 11/2023 |

OTHER PUBLICATIONS

An et al., Recovery of lithium from Uyuni salar brine. Hydrometallurgy 117-118:64-70 (2012).
Anisimov et al., Band theory and Mott insulators: Hubbard U instead of Stoner I Phys. Rev. B. 44:943-954 (1991).
Anisimov et al., Density-functional theory and NiO photoemission spectra. Phys. Rev. B. 48:16929-16934 (1993).
Belharouak et al. Synthesis and electrochemical analysis of vapor-deposited carbon-coated LiFePO4. Electrochemistry Communications 7(10):983-988 (2005).
Blochl., Projector augmented-wave method. Phys. Rev. B 50:17953 (1994).
Bretti et al., SIT parameters for 1: 1 electrolytes and correlation with Pitzer coefficients. J Solution Chem 35:1401-1415 (2006).
Chitrakar et al., A New Type of Manganese Oxide (MnO2·0.5H2O) Derived from Li1.6Mn1.6O4 and Its Lithium Ion-Sieve Properties. Chem. Mater. 12:3151-3157 (2000).
Chitrakar et al. Lithium recovery from salt lake brine by H2TiO3. Dalton Trans 43:8933-8939 (2014).
Chitrakar et al. Selective Uptake of Lithium Ion from Brine by H1.33Mn1.67O4 and H1.6Mn1.6O4. Chem Lett 41:1647-1649 (2012).
Cho et al. High-Performance ZrO2-Coated LiNiO2 Cathode Material. Electrochem Solid-State Lett 4(10):A159-A161 (2001).
Co-pending U.S. Appl. No. 18/199,494, inventor Snydacker; David Henry, filed May 19, 2023.
Co-pending U.S. Appl. No. 18/200,306, inventor Snydacker; David Henry, filed May 22, 2023.
Co-pending U.S. Appl. No. 18/365,090, inventors Grosso; Giordano Nicolas Andres et al., filed Aug. 3, 2023.
Co-pending U.S. Appl. No. 18/476,180, inventors Snydacker; David Henry et al., filed Sep. 27, 2023.
Co-pending U.S. Appl. No. 18/476,195, inventors Snydacker; David Henry et al., filed Sep. 27, 2023.
Department of Energy. Ion Exchange Materials for Lithium Extraction (Topic: 15, Subtopic: e)-13 Abstract. Available at https://www.sbir.gov/sbirsearch/detail/1307793 (3 pgs.) (2017).
Dlamini et al. Polymeric ion exchanger supported ferric oxide nanoparticles as adsorbents for toxic metal ions from aqueous solutions and acid mine drainage. J Environ Health Sci Eng 17(2):719-730 (2019).
Doan et al. Preparation of carbon coated LiMnPO"4 powders by a combination of spray pyrolysis with dry ball-milling followed by heat treatment. Advanced Powder Technology 21(2):187-196 (2010).
Dudarev et al., Electron-energy-loss spectra and the structural stability of nickel oxide: An LSDA+U study. Phys. Rev. B. 57:1505-1509 (1998).
Endres et al., Extraction of lithium from spinel phases of the system Li1+xMn2-xO4-d. Journal of Power Sources 69:145-156 (1997).
Grindy et al., Approaching chemical accuracy with density functional calculations: Diatomic energy corrections. Phys. Rev. B. 87:075150 (2013).
Hoshino., Innovative lithium recovery technique from seawater by using world-first dialysis with a lithium ionic superconductor. Desalination 359:59-63 (2014).
Hoshino., Lithium Recovery Technology for Stably Supplying Fuel to Fusion Reactors: World-First Dialysis Technique for Lithium Recovery from Seawater, JAEA R&D Review (pp. 116) (2015).
Hui et al., Preparation of new lithium adsorbents. Inorganic Chemicals Industry, Feb. 2014 (English abstract).
Jain. et al. Commentary: The Materials Project: A materials genome approach to accelerating materials innovation. APL Mater. 1:011002-11 (2013).
Jain et al. Formation enthalpies by mixing GGA and GGA+U calculations. Phys. Rev. B 84:045115 (2011).
Jiang. Synthesis of Spinel Li2MnO3 and Its Ion-exchange Property for Li+. Advanced Materials Research 554-556:860-863 (Jul. 2012).
Kesler et al. Global lithium resources: Relative importance of pegmatite, brine and other deposits. Ore Geology Reviews 48:55-69 (2012).
Kirklin et al., The Open Quantum Materials Databse (OQMD): assessing the accuracy of DFT formation energies. Nature Publishing Group 1:1-15 (2015).
Kresse et al., Ab Initio Molecular Dynamics for Liquid Metals. Phys. Rev. B 7:558-561 (1993).
Kresse et al., Ab initio molecular-dynamics simulation of the liquid-metal-amorphous-semiconductor transition in germanium. Phys. Rev. B. 49:14251-14269 (1994).
Kresse et al., Efficiency of ab-initio total energy calculations for metals and semiconductors using a plane-wave basis set. Computational Materials Science 6(1):15-50(1996).
Kresse et al., Efficient iterative schemes for ab initio total-energy calculations using a plane-wave basis set. Phys Rev B Condens Matter 54(16):11169-11186 (1996).
Kresse et al., From ultrasoft pseudopotentials to the projector augmented-wave method. Phys. Rev. B. 59:1758-1774 (1999).
Larumbe et al. Effect of a SiO2 coating on the magnetic properties of Fe3O4 nanoparticles. J Phys Condens Matter 24(26):266007 (2012).
Liechtenstein et al., Density-functional theory and strong interactions: Orbital ordering in Mott-Hubbard insulators. Phys. Rev. B 52:5467-5470 (1995).
Liu et al. Recent developments in electrolytic devices for ion chromatography. J Biochem Biophys Methods 60(3):205-232 (2004).
Lu et al. Soft chemical synthesis and adsorption properties of MnO2 center dot 0.5H(2)O, a high performance ion sieve for lithium. Acta Chimica Sinica 65(12):1135-1139 (2007).
Meshram et al., Extraction of lithium from primary and secondary sources by pre-treatment, leaching and separation: A comprehensive review. Hydrometallurgy 150:192-208 (2014).
Miyai et al. Bench scale studies on lithium recovery from sea water. Nippon Kaisui Gakkai-Shi- Bulletin Of The Society Of Sea Waterscience, Japan 49(4):226-230 (1995) (English Abstract).
Nishihama et al. Selective recovery process of lithium from seawater using integrated ion exchange methods. Solvent Extraction and Ion Exchange 29:421-431 (2011).
Oh et al. Double Carbon Coating of LiFePO4 as High Rate Electrode for Rechargeable Lithium Batteries. Adv. Mater. 22:4842-4845 (2010).
Ong et al., Li—Fe—P—O2 phase diagram from first principles calculations. Chem. Mater., 20:1798-1807 (2008).
Onodera et al., Preparation method and lithium adsorption propety of LAMBDA.-MnO2-silica composite. Chem. Lett., 19(10):1801-1804 (1990).
Ooi et al., Mechanism of lithium (1+) insertion in spinel-type manganese oxide. Redox and ion-exchange reactions. Langmuir 7:1167-1171 (1991).
Pareja et al. Corrosion behaviour of zirconia barrier coatings on galvanized steel. Surface and Coatings Technology 200(22-23):6606-6610 (2006).

(56) References Cited

OTHER PUBLICATIONS

Patel et al. Ionic and electronic conductivities of atomic layer deposition thin film coated lithium ion battery cathode particles. RSC Advances 6:98768-98776 (2016).
PCT/US2017/015790 International Search Report and Written Opinion dated Apr. 20, 2017.
PCT/US2017/061384 International Search Report and Written Opinion dated Feb. 14, 2018.
PCT/US2018/044821 International Search Report and Written Opinion dated Oct. 12, 2018.
PCT/US2018/044868 International Search Report and Written Opinion dated Mar. 6, 2019.
PCT/US2019/017885 International Search Report and Written Opinion dated Jun. 14, 2019.
PCT/US2019/019780 International Search Report and Written Opinion dated Jun. 14, 2019.
PCT/US2021/012534 International Search Report and Written Opinion dated Apr. 27, 2021.
PCT/US2021/036227 International Search Report and Written Opinion dated Nov. 2, 2021.
PCT/US2021/059921 International Search Report and Written Opinion dated Mar. 14, 2022.
PCT/US2022/025810 International Search Report and Written Opinion dated Sep. 30, 2022.
PCT/US2022/025810 Invitation to Pay Additional Fees dated Jul. 5, 2022.
PCT/US2023/016438 International Search Report and Written Opinion dated Jun. 27, 2023.
PCT/US2023/016443 International Search Report and Written Opinion dated Jul. 25, 2023.
PCT/US2023/017172 International Search Report and Written Opinion dated Sep. 19, 2023.
PCT/US2023/018806 International Search Report and Written Opinion dated Jun. 30, 2023.
PCT/US2023/020726 International Search Report and Written Opinion dated Aug. 25, 2023.
Perdew et al. Generalized gradient approximation made simple. Phys. Rev. Lett. 77:3865-3868 (1996).
Reichel et al. Lithium recovery from lithium-containing micas using sulfur oxidizing microorganisms. Minerals Engineering 106:18-21 (2017).
Rioyo et al. Lithium Extraction from Spodumene by the Traditional Sulfuric Acid Process: A Review. Mineral Processing and Extractive Metallurgy Review 43(1):97-106 (2020).
Saal et al., Materials Design and Discovery with High-Throughput Density Functional Theory: The Open Quantum Materials Database (OQMD). JOM 65:1501-1509 (2013).
Schultze et al. Recovering Lithium Chloride From a Geothermal Brine. US Department of the Interior, Bureau of Mines. vol. 8883 (18 pgs) (1984).
Swain., Recovery and recycling of lithium: A review, Separation and Purification Technology 172:388-40 (2016).
Tarakina et al. Defect crystal structure of new TiO(OH)2 hydroxide and related lithium salt Li2TiO3. Dalton Trans 39:8168-8176 (2010).
Thackeray et al., Li 2 MnO 3-stabilized LiMO 2 (M=Mn, Ni, Co) electrodes for lithium-ion batteries. J Mat Chem., 17:3112 (2007).
Umeno et al. Preparation and Adsorptive Properties of Membrane-Type Adsorbents for Lithium Recovery from Seawater. Ind Eng Chem Res 41(17):4281-4287 (2002).
Xiao et al. Adsorption and desorption behavior of lithium ion in spherical PVC-MnO2 ion sieve. Industrial & engineering chemistry research, 51(33):10921-10929 (2012).
Xiao et al. Lithium ion recovery from brine using granulated polyacrylamide-MnO 2 ion-sieve. Chemical Engineering Journal 279:659-666 (2015).
Xie et al. Preparation and Lithium Extraction of Li1.6Mn1.6O4/PVDF Porous Film. Chinese Journal of Chemical Engineering pp. 1-3 2014) Retrieved from the Internet: URL:https://d.wanfangdata.com.cn/periodical/ChIQZXJpb2RpY2FsQ0hJTmV3UzlwMjlwND E1Eg1oZ3hiMjAxNDAxMDMxG ghva3phOTI2ZQ°/O3D°/O3D.
Xu et al. Extraction of lithium with functionalized lithium ion-sieves. Progress in Materials Science 84:276-313 (2016).
Yang et al., TiO2 Coating Modification for Lithium Ion Sieve. Material Reports 31:435-438 (2017) (English Abstract).
Zaghib et al. Safe and fast-charging Li-ion battery with long shelf life for power applications. J Power Sources 196:3949-3954 (2011).
Zandvakili et al. Preparation and characterisation of lithium ion exchange composite for the recovery of lithium from brine. Mineral Processing and Extractive Metallurgy 127(3):176-181 (2017).
Zhang et al. Li2SnO3 derived secondary Li-Sn alloy electrode for lithium-ion batteries. J. Alloys Compd. 415:229-233 (2006).
Zhu et al. Adsorption and desorption properties of Li+ on PVC-H1.6Mn1.6O4 lithium ion-sieve membrane. Chemical Engineering Journal 235:340-348 (2014).
Anonymous. Pure Energy Minerals Reports High Lithium Recoveries From Successful Mini-Pilot Testing Campaign. (Dec. 13, 2016) Retrieved from the Internet: URL:https://pureenergyminerals.com/pure-energy-minerals-reports-high-lithium-recoveries-from-successful-mini-pilot/.
Molnar et al. Preliminary Economic Assessment (Rev. 1) of the Clayton Valley Lithium Project. (Jan. 28, 2019) Retrieved from the Internet: URL:https://wp-pureenergyminerals-2023.s3.ca-central-1.amazonaws.com/media/2018/04/PureEnergy_ClaytonValleyPEA_Rev1_23March2018.pdf.
PCT/US2023/080369 International Invitation to Pay Additional Fees dated Jan. 26, 2024.
Renew et al. Geothermal Thermoelectric Generation (G-TEG) with Integrated Temperature Driven Membrane Distillation and Novel Manganese Oxide for Lithium Extraction. (Jun. 1, 2017) Retrieved from the Internet: URL:https://www.osti.gov/servlets/purl/1360976.
Song et al. Lithium extraction from Chinese salt-lake brines: opportunities, challenges, and future outlook. Environ. Sci.: Water Res. Technol., 3:593-597 (2017).

* cited by examiner

ION EXCHANGE REACTOR WITH PARTICLE TRAPS FOR LITHIUM EXTRACTION

CROSS-REFERENCE

This application is a continuation of U.S. application Ser. No. 16/970,238, filed Aug. 14, 2020, which is a U.S. National Stage entry of International Application No. PCT/US2019/019780, filed Feb. 27, 2019, which claims the benefit of U.S. Provisional Patent Application Ser. No. 62/636,766, filed Feb. 28, 2018; which is incorporated herein by reference in its entirety.

BACKGROUND OF THE INVENTION

Lithium is an essential element for high-energy rechargeable batteries and other technologies. Lithium can be found in a variety of liquid solutions, including natural and synthetic brines and leachate solutions from minerals and recycled products.

SUMMARY OF THE INVENTION

Lithium can be extracted from liquid resources using an ion exchange process based on inorganic ion exchange materials. Inorganic ion exchange materials absorb lithium ions from a liquid resource while releasing hydrogen ions, and then elute lithium ions in acid while absorbing hydrogen ions. The ion exchange process can be repeated to extract lithium ions from a liquid resource and yield a concentrated lithium ion solution. The concentrated lithium ion solution can be further processed into chemicals for the battery industry or other industries.

Ion exchange particles are loaded into an ion exchange reactor for lithium extraction. Alternating flows of brine, water, and acid are flowed through the ion exchange reactor to enable lithium uptake from the brine into the ion exchange particles, water washing of residual brine from the ion exchange particles, and acid elution of lithium from the ion exchange particles to form a lithium eluate solution. The release of hydrogen during lithium uptake will acidify the brine and limit lithium uptake unless the pH of the brine is maintained in a suitable range to facilitate thermodynamically favorable lithium uptake and concomitant hydrogen release.

To retain the ion exchange particles in the ion exchange reactor, while allowing flows of brine, water, and acid to enter and exit the ion exchange reactor, one or more particle traps are used with the ion exchange reactor. These particle traps separate the solid ion exchange particles from the liquid flows by utilizing filtration, gravity sedimentation, centrifugal sedimentation, magnetic fields, other methods of solid-liquid separation, or combinations thereof.

One aspect described herein is an ion exchange reactor for generating a lithium eluate solution from a liquid resource, comprising: a tank; ion exchange particles that selectively absorb lithium from said liquid resource and elute said lithium eluate solution when treated with an acid solution after absorbing lithium from said liquid resource; one or more particle traps; and provision to modulate pH of said liquid resource.

In some embodiments, said tank has a conical shape. In some embodiments, said conical shape allows said ion exchange particles to settle into a settled bed so that liquid can be removed from above said settled bed. In some embodiments, modulation of said pH of said liquid resource occurs in the tank. In some embodiments, modulation of said pH of said liquid resource occurs prior to injection of said liquid resource into the tank. In some embodiments, said one or more particle traps comprise one or more filters inside said tank. In some embodiments, said one or more particle traps is located at the bottom of said tank. In some embodiments, said one or more particle traps comprise one or more meshes.

In some embodiments, said one or more meshes comprise a pore space of less than about 200 microns. In some embodiments, said one or more meshes comprise a pore space of less than about 100 microns. In some embodiments, said one or more meshes comprise a pore space of less than about 100 microns. In some embodiments, said one or more meshes comprise a pore space of less than about 50 microns. In some embodiments, said one or more meshes comprise a pore space of less than about 25 microns. In some embodiments, said one or more meshes comprise a pore space of less than about 10 microns.

In some embodiments, said one or more particle traps comprise multi-layered meshes. In some embodiments, said multi-layered meshes comprise at least one finer mesh for filtration and at least one coarser mesh for structural support. In some embodiments, said one or more particle traps comprise one or more meshes supported by a structural support. In some embodiments, said one or more particle traps comprise one or more polymer meshes. In some embodiments, said one or more polymer meshes are selected from the group consisting of polyetheretherketone, ethylene tetrafluorethylene, polyethylene terephthalate, polypropylene, and combinations thereof. In some embodiments, said one or more particle traps comprise one or more meshes comprising a metal wire mesh. In some embodiments, said metal wire mesh is coated with a polymer.

In some embodiments, said ion exchange reactor is configured to move said ion exchange particles into one or more columns for washing. In some embodiments, said ion exchange reactor is configured to allow the ion exchange particles to settle into one or more columns for washing. In some embodiments, said columns are affixed to the bottom of said tank. In some embodiments, said one or more particle traps comprise one or more filters mounted in one or more ports through the wall of said tank. In some embodiments, said one or more particle traps comprise one or more filters external to said tank, and with provision for fluid communication between said one or more filters and said tank. In some embodiments, said one or more particle traps comprise one or more gravity sedimentation devices external to said tank, and with provision for fluid communication between said one or more gravity sedimentation devices and said tank. In some embodiments, said one or more particle traps comprise one or more gravity sedimentation devices internal to said tank. In some embodiments, said one or more particle traps comprise one or more centrifugal sedimentation devices external to said tank, and with provision for fluid communication between said one or more centrifugal sedimentation devices and said tank.

In some embodiments, said one or more particle traps comprise one or more centrifugal sedimentation devices internal to said tank. In some embodiments, said one or more particle traps comprise one or more settling tanks, one or more centrifugal devices, or combinations thereof external to said tank, and with provision for fluid communication between said one or more settling tanks, centrifugal devices, or combinations thereof, and said tank. In some embodiments, said one or more particle traps comprise one or more meshes, one or more centrifugal devices, or combinations thereof external to said tank, and with provision for fluid communication between said one or more meshes, centrifugal devices, or combinations thereof, and said tank. In some embodiments, said one or more particle traps comprise one or more settling tanks, one or more meshes, or combinations thereof external to said tank, and with provision for fluid communication between said one or more settling tanks, meshes, or combinations thereof, and said tank. In some embodiments, said one or more particle traps comprise one or more meshes, one or more settling tanks, one or more centrifugal devices, or combinations thereof external to said tank, and with provision for fluid communication between said one or more meshes, one or more settling tanks, centrifugal devices, or combinations thereof, and said tank.

In some embodiments, the ion exchange particles are stirred. In some embodiments, the ion exchange particles are stirred by a mixer. In some embodiments, the ion exchange particles are stirred by a propeller. In some embodiments, the ion exchange particles are fluidized by pumping solution into the tank near the bottom of the tank. In some embodiments, the ion exchange particles are fluidized by pumping solution from the tank back into the tank near the bottom of the tank. In some embodiments, the ion exchange particles are fluidized by pumping a slurry of the ion exchange particles from near the bottom of the tank to a higher level in the tank.

In some embodiments, the ion exchange reactor further comprises one or more staged elution tanks, wherein intermediate eluate solutions comprising mixtures of protons and lithium ions are stored and used further to elute lithium from said ion exchange particles that are freshly lithiated. In some embodiments, the ion exchange reactor further comprises one or more staged elution tanks, wherein intermediate eluate solutions comprising mixtures of protons and lithium ions are mixed with additional acid and used further to elute lithium from said ion exchange particles.

In some embodiments, said ion exchange particles further comprise a coating material. In some embodiments, said coating material is a polymer. In some embodiments, said coating of said coating material comprises a chloro-polymer, a fluoro-polymer, a chloro-fluoro-polymer, a hydrophilic polymer, a hydrophobic polymer, co-polymers thereof, mixtures thereof, or combinations thereof.

One aspect described herein is an ion exchange system for generating a lithium eluate solution from a liquid resource, comprising: a networked plurality of tanks; ion exchange particles that selectively absorb lithium from said liquid resource and elute said lithium eluate solution when treated with an acid solution; one or more particle traps; and provision to modulate pH of said liquid resource.

In some embodiments, said ion exchange particles are retained in said networked plurality of tanks with flows of brine, washing solution, and acid alternately moving through said plurality of tanks. In some embodiments, said ion exchange particles are moved through said networked plurality of tanks against counter-current flows of brine, washing solution, and acid. In some embodiments, tanks selected from said networked plurality of tanks are sized for batches of brine, washing solution, or acid and wherein said ion exchange particles are moved through said networked plurality of tanks.

One aspect described herein is a method of generating a lithium eluate solution from a liquid resource, comprising: providing an ion exchange reactor comprising a tank, ion exchange particles that selectively absorb lithium from a liquid resource and elute a lithium eluate solution when treated with an acid solution after absorbing lithium ions from said liquid resource, one or more particle traps, and provision to modulate pH of said liquid resource; flowing a liquid resource into said ion exchange reactor thereby allowing said ion exchange particles to selectively absorb lithium from said liquid resource; treating said ion exchange particles with an acid solution to yield said lithium eluate solution; and passing said lithium eluate solution through said one or more particle traps to collect said lithium eluate solution.

In some embodiments, said tank has a conical shape. In some embodiments, said conical shape allows said ion exchange particles to settle into a settled bed so that liquid can be removed from above said settled bed. In some embodiments, modulation of said pH of said liquid resource occurs in the tank. In some embodiments, modulation of said pH of said liquid resource occurs prior to injection of said liquid resource into the tank. In some embodiments, said one or more particle traps comprise one or more filters inside said tank. In some embodiments, said one or more particle traps is located at the bottom of said tank. In some embodiments, said one or more particle traps comprise one or more meshes.

In some embodiments, said one or more meshes comprise a pore space of less than about 200 microns. In some embodiments, said one or more meshes comprise a pore space of less than about 100 microns. In some embodiments, said one or more meshes comprise a pore space of less than about 100 microns. In some embodiments, said one or more meshes comprise a pore space of less than about 50 microns. In some embodiments, said one or more meshes comprise a pore space of less than about 25 microns. In some embodiments, said one or more meshes comprise a pore space of less than about 10 microns. In some embodiments, said one or more particle traps comprise multi-layered meshes. In some embodiments, said multi-layered meshes comprise at least one finer mesh for filtration and at least one coarser mesh for structural support. In some embodiments, said one or more particle traps comprise one or more meshes supported by a structural support. In some embodiments, said one or more particle traps comprise one or more polymer meshes. In some embodiments, said one or more polymer meshes are selected from the group consisting of polyetheretherketone, ethylene tetrafluorethylene, polyethylene terephthalate, polypropylene, and combinations thereof. In some embodiments, said one or more particle traps comprise one or more meshes comprising a metal wire mesh. In some embodiments, said metal wire mesh is coated with a polymer.

In some embodiments, said ion exchange reactor is configured to move said ion exchange particles into one or more columns for washing. In some embodiments, said ion exchange reactor is configured to allow the ion exchange particles to settle into one or more columns for washing. In some embodiments, said columns are affixed to the bottom of said tank. In some embodiments, said one or more particle traps comprise one or more filters mounted in one or more ports through the wall of said tank.

In some embodiments, said one or more particle traps comprise one or more filters external to said tank, and with provision for fluid communication between said one or more filters and said tank. In some embodiments, said one or more particle traps comprise one or more gravity sedimentation devices external to said tank, and with provision for fluid communication between said one or more gravity sedimentation devices and said tank. In some embodiments, said one or more particle traps comprise one or more gravity sedimentation devices internal to said tank. In some embodiments, said one or more particle traps comprise one or more centrifugal sedimentation devices external to said tank, and with provision for fluid communication between said one or more centrifugal sedimentation devices and said tank. In some embodiments, said one or more particle traps comprise one or more centrifugal sedimentation devices internal to said tank. In some embodiments, said one or more particle traps comprise one or more settling tanks, one or more centrifugal devices, or combinations thereof external to said tank, and with provision for fluid communication between said one or more settling tanks, centrifugal devices, or combinations thereof, and said tank. In some embodiments, said one or more particle traps comprise one or more meshes, one or more centrifugal devices, or combinations thereof external to said tank, and with provision for fluid communication between said one or more meshes, centrifugal devices, or combinations thereof, and said tank. In some embodiments, said one or more particle traps comprise one or more settling tanks, one or more meshes, or combinations thereof external to said tank, and with provision for fluid communication between said one or more settling tanks, meshes, or combinations thereof, and said tank. In some embodiments, said one or more particle traps comprise one or more meshes, one or more settling tanks, one or more centrifugal devices, or combinations thereof external to said tank, and with provision for fluid communication between said one or more meshes, one or more settling tanks, centrifugal devices, or combinations thereof, and said tank.

In some embodiments, the ion exchange particles are stirred. In some embodiments, the ion exchange particles are stirred by a mixer. In some embodiments, the ion exchange particles are stirred by a propeller. In some embodiments, the ion exchange particles are fluidized by pumping solution into the tank near the bottom of the tank. In some embodiments, the ion exchange particles are fluidized by pumping solution from the tank back into the tank near the bottom of the tank. In some embodiments, the ion exchange particles are fluidized by pumping a slurry of the ion exchange particles from near the bottom of the tank to a higher level in the tank.

In some embodiments, the method further comprises one or more staged elution tanks, wherein intermediate eluate solutions comprising mixtures of protons and lithium ions are stored and used further to elute lithium from said ion exchange particles that are freshly lithiated. In some embodiments, the method further comprises one or more staged elution tanks, wherein intermediate eluate solutions comprising mixtures of protons and lithium ions are mixed with additional acid and used further to elute lithium from said ion exchange particles.

In some embodiments, said ion exchange particles further comprise a coating material. In some embodiments, said coating material is a polymer. In some embodiments, said coating material comprises a chloro-polymer, a fluoro-polymer, a chloro-fluoro-polymer, a hydrophilic polymer, a hydrophobic polymer, co-polymers thereof, mixtures thereof, or combinations thereof.

One aspect described herein is an ion exchange reactor for generating a lithium eluate solution from a liquid resource, comprising: a tank with a conical shape, wherein said conical shape allows said ion exchange particles to settle into a settled bed so that liquid can be removed from above said settled bed; ion exchange particles that selectively absorb lithium from said liquid resource and elute said lithium eluate solution when treated with an acid solution after absorbing lithium from said liquid resource; one or more particle traps located at the bottom of said tank, wherein said one or more particle traps comprise one or more meshes; and provision to modulate pH of said liquid resource, wherein said modulation of said pH of said liquid resource is configured to occur in the tank or prior to injection of said liquid resource into the tank.

In some embodiments, said one or more meshes comprise a pore space of less than about 200 microns. In some embodiments, said one or more meshes comprise a pore space of less than about 100 microns. In some embodiments, said one or more meshes comprise a pore space of less than about 100 microns. In some embodiments, said one or more meshes comprise a pore space of less than about 50 microns. In some embodiments, said one or more meshes comprise a pore space of less than about 25 microns. In some embodiments, said one or more meshes comprise a pore space of less than about 10 microns.

In some embodiments, said one or more meshes are one or more polymer meshes. In some embodiments, said one or more polymer meshes are selected from the group consisting of polyetheretherketone, ethylene tetrafluorethylene, polyethylene terephthalate, polypropylene, and combinations thereof. In some embodiments, said one or more meshes comprise a metal wire mesh In some embodiments, said metal wire mesh is coated with a polymer. In some embodiments, said polymer coating said metal wire mesh is selected from the group consisting of polyetheretherketone, ethylene tetrafluorethylene, polyethylene terephthalate, polypropylene, and combinations thereof.

One aspect described herein is an ion exchange reactor for generating a lithium eluate solution from a liquid resource, comprising: a tank with a conical shape, wherein said conical shape allows said ion exchange particles to settle into a settled bed so that liquid can be removed from above said settled bed; ion exchange particles that selectively absorb lithium from said liquid resource and elute said lithium eluate solution when treated with an acid solution after absorbing lithium from said liquid resource; one or more particle traps located at the bottom of said tank, wherein said one or more particle traps comprise multi-layered meshes; and provision to modulate pH of said liquid resource, wherein said modulation of said pH of said liquid resource is configured to occur in the tank or prior to injection of said liquid resource into the tank.

In some embodiments, said multi-layered meshes comprise at least one finer mesh for filtration and at least one coarser mesh for structural support. In some embodiments, said one or more particle traps comprise one or more meshes supported by a structural support. In some embodiments, said one or more meshes are one or more polymer meshes. In some embodiments, said one or more polymer meshes are selected from the group consisting of polyetheretherketone, ethylene tetrafluorethylene, polyethylene terephthalate, polypropylene, and combinations thereof. In some embodiments, said one or more meshes comprise a metal wire mesh. In some embodiments, said metal wire mesh is coated with a polymer. In some embodiments, said polymer coating said metal wire mesh is selected from the group consisting of polyetheretherketone, ethylene tetrafluorethylene, polyethylene terephthalate, polypropylene, and combinations thereof.

One aspect described herein is a method of generating a lithium eluate solution from a liquid resource, comprising: providing an ion exchange reactor comprising (i) a tank with a conical shape, wherein said conical shape allows said ion exchange particles to settle into a settled bed so that liquid can be removed from above said settled bed; (ii) ion exchange particles that selectively absorb lithium from said liquid resource and elute said lithium eluate solution when treated with an acid solution after absorbing lithium from said liquid resource; (iii) one or more particle traps located at the bottom of said tank, wherein said one or more particle traps comprise one or more meshes; and (iv) provision to modulate pH of said liquid resource, wherein said modulation of said pH of said liquid resource is configured to occur in the tank or prior to injection of said liquid resource into the tank; flowing a liquid resource into said ion exchange reactor thereby allowing said ion exchange particles to selectively absorb lithium from said liquid resource; treating said ion exchange particles with an acid solution to yield said lithium eluate solution; and passing said lithium eluate solution through said one or more particle traps to collect said lithium eluate solution.

In some embodiments, said one or more meshes comprise a pore space of less than about 200 microns. In some embodiments, said one or more meshes comprise a pore space of less than about 100 microns. In some embodiments, said one or more meshes comprise a pore space of less than about 100 microns. In some embodiments, said one or more meshes comprise a pore space of less than about 50 microns. In some embodiments, said one or more meshes comprise a pore space of less than about 25 microns. In some embodiments, said one or more meshes comprise a pore space of less than about 10 microns.

In some embodiments, said one or more meshes are one or more polymer meshes. In some embodiments, one or more polymer meshes are selected from the group consisting of polyetheretherketone, ethylene tetrafluorethylene, polyethylene terephthalate, polypropylene, and combinations thereof. In some embodiments, said one or more meshes comprise a metal wire mesh In some embodiments, said metal wire mesh is coated with a polymer. In some embodiments, said polymer coating said metal wire mesh is selected from the group consisting of polyetheretherketone, ethylene tetrafluorethylene, polyethylene terephthalate, poly propylene, and combinations thereof.

One aspect described herein is a method of generating a lithium eluate solution from a liquid resource, comprising: providing an ion exchange reactor comprising: (i) a tank with a conical shape, wherein said conical shape allows said ion exchange particles to settle into a settled bed so that liquid can be removed from above said settled bed; (ii) ion exchange particles that selectively absorb lithium from said liquid resource and elute said lithium eluate solution when treated with an acid solution after absorbing lithium from said liquid resource; (iii) one or more particle traps located at the bottom of said tank, wherein said one or more particle traps comprise multi-layered meshes; and (iv) provision to modulate pH of said liquid resource, wherein said modulation of said pH of said liquid resource is configured to occur in the tank or prior to injection of said liquid resource into the tank; flowing a liquid resource into said ion exchange reactor thereby allowing said ion exchange particles to selectively absorb lithium from said liquid resource; treating said ion exchange particles with an acid solution to yield said lithium eluate solution; and passing said lithium eluate solution through said one or more particle traps to collect said lithium eluate solution.

In some embodiments, said multi-layered meshes comprise at least one finer mesh for filtration and at least one coarser mesh for structural support. In some embodiments, said one or more particle traps comprise one or more meshes supported by a structural support. In some embodiments, said one or more meshes are one or more polymer meshes. In some embodiments, said one or more polymer meshes are selected from the group consisting of polyetheretherketone, ethylene tetrafluoroethylene, polyethylene terephthalate, polypropylene, and combinations thereof.

In some embodiments, said one or more meshes comprise a metal wire mesh. In some embodiments, said metal wire mesh is coated with a polymer. In some embodiments, said polymer coating said metal wire mesh is selected from the group consisting of polyetheretherketone, ethylene tetrafluorethylene, polyethylene terephthalate, polypropylene, and combinations thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
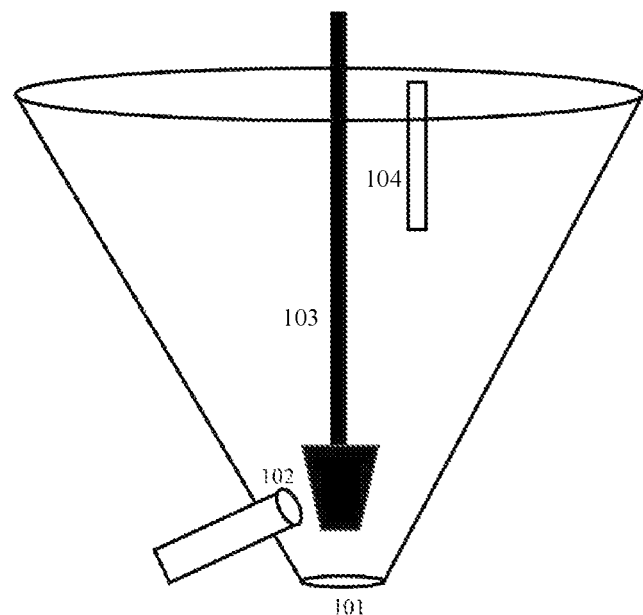
FIG. 1 illustrates an ion exchange reactor comprising a stirred tank having a conical shape and one or more filters mounted in a port through the wall of the tank.

The terms "lithium", "lithium ion", and "Li+" are used interchangeably in the present specification and these terms are synonymous unless specifically noted to the contrary. The terms "hydrogen", "hydrogen ion", "proton", and "H+" are used interchangeably in the present specification and these terms are synonymous unless specifically noted to the contrary. The terms "lithiated", "lithium-enriched", and "lithium-exchanged" are used interchangeably in the present specification and these terms are synonymous unless specifically noted to the contrary. The terms "protonated", "hydrogen-enriched", and "proton-exchanged", are used interchangeably in the present specification and these terms are synonymous unless specifically noted to the contrary.

Lithium Ion Exchange Reactor with Particle Traps

An aspect of the invention described herein is an ion exchange reactor for extracting lithium from a liquid resource. This reactor functions to contact the liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using an acid solution, and separate the particles from the acid solution. The reactor includes a provision for measuring and adjusting the pH of the liquid resource, to neutralize protons released by the ion exchange material during lithium uptake.

An aspect of the invention described herein is an ion exchange reactor for extracting lithium from a liquid resource, comprising: a) one or more tanks; b) ion exchange particles; c) one or more particle traps; and d) provision to modulate pH of the liquid resource.

An aspect of the invention described herein is a method for extracting lithium from a liquid resource, comprising: a) providing an ion exchange reactor comprising one or more particle traps; b) providing ion exchange particles in said ion exchange reactor; c) contacting said ion exchange particles in said ion exchange reactor with said liquid resource, wherein hydrogen ions from said ion exchange particles are exchanged with lithium ions from said liquid resource to produce lithium-enriched ion exchange particles in said ion exchange unit; d) removing said liquid resource from said ion exchange reactor while retaining said ion exchange particles in said ion exchange reactor using said one or more particle traps; e) washing said lithium-enriched ion exchange particles with a water solution one or more times; f) removing said water solution from said ion exchange reactor while retaining said ion exchange particles in said ion exchange reactor using said one or more particle traps; g) treating said lithium-enriched ion exchange particles with an acid solution, wherein said lithium ions from said lithium-enriched ion exchange particles are exchanged with hydrogen ions from said acid solution to produce a lithium eluate; and h) removing said lithium eluate from said ion exchange reactor while retaining said ion exchange particles in said ion exchange reactor using said one or more particle traps.

In some embodiments, the acid solution is hydrochloric acid, sulfuric acid, nitric acid, other acid, or combinations thereof. In some embodiments, the acid solution has a proton concentration less than about 10 N, less than about 3N, less than about 1N, less than about 0.3 N, less than about 0.1 N, more than about 0.05 N, more than about 0.1 N, more than about 0.2 N, more than about 0.3 N, more than about 0.4 N, more than about 0.5 N, more than about 0.75 N, more than about 1 N, more than about 2 N, more than about 3 N, more than about 4 N, more than about 5 N, more than about 6 N, more than about 7 N, more than about 8 N, more than about 9 N, from about 0.05 N to about 10 N, from about 0.1 N to about 10 N, from about 0.2 N to about 10 N, from about 0.3 N to about 10 N, from about 0.4 N to about 10 N, from about 0.5 N to about 10 N, from about 0.6 N to about 10 N, from about 0.7 N to about 10 N, from about 0.8 N to about 10 N, from about 0.9N to about 10 N, from about 1 N to about 10 N, from about 1 N to about 9 N, from about 2 N to about 8 N, or from about 3 N to about 7 N.

In some embodiments, the lithium eluate solution contains lithium chloride, lithium sulfate, lithium nitrate, or other lithium salts. In some embodiments, the lithium eluate solution is processed to produce lithium metal, lithium carbonate, lithium hydroxide, lithium hydroxide monohydrate, lithium nitrate, lithium phosphate, lithium chloride, lithium metal, organometallic lithium, or other lithium salts.

Shaped Tanks

An aspect of the invention described herein is an ion exchange reactor for extracting lithium from liquid resources, comprising: a) a tank with a cross sectional area that is smaller at the bottom; b) ion exchange particles that are loaded into the tank; c) one or more particle traps for containing the ion exchange particles in the tank while liquid flows are removed from the tank; and d) a provision for pH modulation of the liquid resource in the tank.

An aspect of the invention described herein is an ion exchange reactor for generating a lithium eluate solution from a liquid resource, comprising: a tank with a conical shape, wherein said conical shape allows said ion exchange particles to settle into a settled bed so that liquid can be removed from above said settled bed; ion exchange particles that selectively absorb lithium from said liquid resource and elute said lithium eluate solution when treated with an acid solution after absorbing lithium from said liquid resource; one or more particle traps located at the bottom of said tank, wherein said one or more particle traps comprise one or more meshes; and provision to modulate pH of said liquid resource, wherein said modulation of said pH of said liquid resource is configured to occur in the tank or prior to injection of said liquid resource into the tank.

An aspect of the invention described herein is an ion exchange reactor for generating a lithium eluate solution from a liquid resource, comprising: a tank with a conical shape, wherein said conical shape allows said ion exchange particles to settle into a settled bed so that liquid can be removed from above said settled bed; ion exchange particles that selectively absorb lithium from said liquid resource and elute said lithium eluate solution when treated with an acid solution after absorbing lithium from said liquid resource; one or more particle traps located at the bottom of said tank, wherein said one or more particle traps comprise multi-layered meshes; and provision to modulate pH of said liquid resource, wherein said modulation of said pH of said liquid resource is configured to occur in the tank or prior to injection of said liquid resource into the tank.

In some embodiments, the ion exchange reactor comprises a tank with a cone shape. In some embodiments, the cone shape allows the ion exchange particles to settle to the bottom of the cone shape while liquid is removed from the tank above the settled bed of ion exchange particles. In some embodiments, a particle trap may have an inlet located above the settled height of the ion exchange particles. In some embodiments, the shape of the tank enables removal of liquid from above the settled bed of ion exchange particles. In some embodiments, a port is located at the bottom or near the bottom of the tank to allow a slurry comprising ion exchange particles and water to be removed from the tank or injected into the tank. In some embodiments, a filter is located at the bottom or near the bottom of the tank that allows a slurry comprising ion exchange particles and water to be dewatered. In some embodiments, a filter is located at the bottom or near the bottom of the tank that allows solutions to be injected into the tank through the filter. In some embodiments, the ion exchange reactor comprises a tank that is conical or pyramidal near the bottom. In some embodiments, the ion exchange reactor comprises a tank that is conical or pyramidal near the bottom and cylindrical or rectangular near the top.

In some embodiments, volumes of liquid resource and acid solution are loaded into the ion exchange reactor. In some embodiments, the volume of the liquid resource loaded into the ion exchange reactor is greater than the volume of the acid solution by a factor of more than about 2×, more than about 5×, more than about 10×, more than about 20×, more than about 50×, or more than about 100×. In some embodiments, the reactor tank may have a cone shape that is narrower at the bottom to facilitate mixing of ion exchange particles in the tank, to facilitate settling of the ion exchange particles, to facilitate washing of the ion exchange particles, or to facilitate separation of the ion exchange particles from liquid solutions such as liquid resource, acid solution, or washing solution.

In some embodiments, the ion exchange reactor may have a mixing device for mixing ion exchange particles with liquid resources, washing solutions, or acid elution solutions. In some embodiments, the mixing device is an overhead mixer. In some embodiments, the mixing device is a propeller that circulates brine throughout the tank. In some embodiments, the mixing device is a propeller that lifts a slurry of ion exchange particles off the bottom of the tank. In some embodiments, the ion exchange reactor may have one or more mixing devices. In some embodiments, the mixing device is a pump that injects solution into the tank, thereby agitating a bed of ion exchange particles. In some embodiments, the mixing device is a pump that injects solution into the tank, thereby fluidizing or suspending ion exchange particles in solution. In some embodiments, the ion exchange particles are mixed in a solution by pumping a slurry from near the bottom of the tank and injecting said slurry into a higher level of the tank. In some embodiments, the fluidized ion exchange material is mixed by pumping it into and/or out of the tank with no filtration. In some embodiments, the tank of the ion exchange reactor is fitted with one or more sprayers that wash the ion exchange particles off the sides of the tank and move them to the bottom of the tank. In some embodiments, the ion exchange reactor is equipped with baffles. In some embodiments, one or more tanks are equipped with baffles. In some embodiments, one or more tanks are equipped with baffles to improve mixing of the ion exchange particles with brine, water, acid, or other solutions.

In some embodiments, the tank of the ion exchange reactor is rectangular, cylindrical, conical, spherical, parallelogram, rhombohedral, pyramidal, or combinations thereof.

In some embodiments, the one or more meshes comprise a pore space of less than about 200 microns. In some embodiments, the one or more meshes comprise a pore space of less than about 100 microns. In some embodiments, the one or more meshes comprise a pore space of less than about 100 microns. In some embodiments, the one or more meshes comprise a pore space of less than about 50 microns. In some embodiments, the one or more meshes comprise a pore space of less than about 25 microns. In some embodiments, the one or more meshes comprise a pore space of less than about 10 microns. In some embodiments, the one or more meshes are one or more polymer meshes. In some embodiments, the one or more polymer meshes are selected from the group consisting of polyetheretherketone, ethylene tetrafluorethylene, polyethylene terephthalate, polypropylene, and combinations thereof. In some embodiments, the one or more meshes comprise a metal wire mesh. In some embodiments, the metal wire mesh is coated with a polymer. In some embodiments, the polymer coating said metal wire mesh is selected from the group consisting of polyetheretherketone, ethylene tetrafluorethylene, polyethylene terephthalate, polypropylene, and combinations thereof.

In some embodiments, the multi-layered meshes comprise at least one finer mesh for filtration and at least one coarser mesh for structural support. In some embodiments, the one or more particle traps comprise one or more meshes supported by a structural support. In some embodiments, the one or more meshes are one or more polymer meshes. In some embodiments, the one or more polymer meshes are selected from the group consisting of polyetheretherketone, ethylene tetrafluorethylene, polyethylene terephthalate, polypropylene, and combinations thereof. In some embodiments, the one or more meshes comprise a metal wire mesh. In some embodiments, the metal wire mesh is coated with a polymer. In some embodiments, the polymer coating said metal wire mesh is selected from the group consisting of polyetheretherketone, ethylene tetrafluorethylene, polyethylene terephthalate, polypropylene, and combinations thereof.

Filters

In some embodiments, the particle trap is a filter. In some embodiments, the filter is operated as a cake filter. In some embodiments, the filter is operated to limit formation of a filter cake. In some embodiments, the filter is operated with sheer flow. In some embodiments, the filter is operated with backwashing.

In some embodiments, the filter comprises a polymer, a porous polymer, a polymer mesh, or a polymer composite. In some embodiments, the filter comprises a woven polymer or a polymer fabric. In some embodiments, the filter is comprised of polypropylene, polyetheretherketone (PEEK), polyvinylidene difluoride (PVDF), polysulfone, polyethylene, nylon, or another polymer material. In some embodiments, the filter comprises a ceramic, metal, or alloy material. In some embodiments, the filter comprises a polymer, polyaryl ether ketone, polyethylene terephthalate, ethylene tetrafluoroethylene, a hydrophilic polymer, a hydrophobic polymer, a co-polymer, a block-copolymer, or combinations thereof. In some embodiments, the filter comprises a steel or other metallic mesh coated with polymer. In some embodiments, the filter comprises a stainless steel mesh coated with polymer. In some embodiments, the filter comprises a 304 stainless steel mesh coated with polymer. In some embodiments, the coating on the steel mesh comprises an epoxy, a silicone, a chloro-polymer, a fluor-polymer, a chloro-fluoro-polymer, polypropylene, polyetheretherketone (PEEK), polyvinylidene difluoride (PVDF), polysulfone, polyethylene, a thermal cure epoxy, an air dry epoxy, a phenolic epoxy, a phenolic polymer, polytetrafluoroethylene, fluorinated ethylene propylene, a ceramic-epoxy composite coating, ethylene chlorotrifluoroethylene, other polymers combinations thereof, or copolymers thereof. In some embodiments, the mesh comprises an epoxy, a silicone, a chloro-polymer, a fluor-polymer, a chloro-fluoro-polymer, polypropylene, polyetheretherketone (PEEK), polyvinylidene difluoride (PVDF), polysulfone, polyethylene, a thermal cure epoxy, an air dry epoxy, a phenolic epoxy, a phenolic polymer, polytetrafluoroethylene, fluorinated ethylene propylene, a ceramic-epoxy composite coating, ethylene chlorotrifluoroethylene, other polymers combinations thereof, or copolymers thereof. In some embodiments, the filter comprises a mesh comprising polyetheretherketone. In some embodiments, the mesh has a pore size of less than about 200 microns, less than about 100 microns, less than about 50 microns, less than about 25 microns, less than about 10 microns, less than about 2 microns, greater than about 200 microns, or greater than about 400 microns. In some embodiments, a mesh is a woven polymer or a polymer fabric. In some embodiments, the filter is a mesh with a weave that is plain weave, twill weave, plain dutch weave, twill dutch weave, or combinations thereof. In some embodiments, the filter comprises a stainless steel mesh. In some embodiments, the filter comprises a stainless steel mesh coated to improve acid resistance with a material such as nickel, a nickel alloy, an oxide, or another acid-resistant material. In some embodiments, the filter comprises polyamide, aromatic polyamide, polyvinylamine, polypyrrolidine, polyfuran, polyethersulfone, poly sulfone, polypiperzine-amide, polybenzimidazoline, polyoxadiazole, acetylated cellulose, cellulose, a polymer with alternative functionalization of sulfonation, carboxylation, phosphorylation, or combinations thereof, other polymeric layer, or combinations thereof. In some embodiments, the filter further comprises a fabric, polymeric, composite, or metal support. In some embodiments, the filter comprises a metal material coated with oxide, epoxy, polymeric material, or combinations thereof that imbue chemical resistance.

In some embodiments of the filter, the filters are weaved of monofilament or multifilament strands of material. In some embodiments the weave of the filter fabric is plain square, plain twilled, plain dutch, twilled dutch, reverse dutch, duplex dutch, betamesh dutch, basket weaved, or combinations thereof.

In some embodiments of the ion exchange reactor, the filter is located inside the tank, outside the tank (external to the tank), or is mounted in one or more ports through the wall of the tank. In some embodiments, the filter is a planar filter, a tubular filter, a hollow fiber tube filter, a cartridge filter, Scheibler filter, Vallex filter, Sweetland filter, horizontal leaf filter, centrifugal discharge filter, compression filter, Nutsche filter, or a candle filter. In some embodiments, the ion exchange reactor may have more than about one, more than about 5, more than about 20, or more than about 100 filters. In some embodiments, a rotary fan press is used to separate liquid solution from a slurry comprising a liquid solution and ion exchange particles.

In some embodiments, the filters are in the tank. In some embodiments, the filters are mounted in the tank at different heights. In some embodiments, the filters are mounted in a port or flange in the tank wall. In some embodiments, one or more filters is mounted at the bottom of one or more tanks. In some embodiments, one or more filters is mounted at the bottom of one or more columns that are mounted at the bottom of one or more tanks. In some embodiments, the filters are approximately flush with the tank wall. In some embodiments with multiple filters, the filters near the top of the tank are used while ion exchange particles are allowed to settle to the bottom of the tank under the force of gravity. In some embodiments, the filters near the bottom of the tank are used after the ion exchange particles have substantially settled. In some embodiments, filters are arranged vertically or horizontally. In some embodiments, filters form an array inside the volume or along the sides of the tank. In some embodiments, multiple filters are used in series or parallel. In some embodiments, multiple filters are used in series with varying pore size. In some embodiments, a filter comprises a smaller mesh mounted on a larger mesh where the smaller mesh blocks ion exchange particles and the larger mesh provides strength to support the smaller mesh.

In some embodiments, liquid resources, acid solutions, or washing solutions are removed from the tank through the filters. In some embodiments, the acid solutions are removed from the tank through filters near the bottom of the tank. In some embodiments, liquid resources are removed from the tank through filters near the top, middle, and bottom of the tank. In some embodiments, washing solutions are removed from the tank through filters near the top, middle, and bottom of the tank.

In some embodiments, broken filters, or filters that no longer operate within acceptable range of their original specifications, are replaced during operation of the ion exchange reactor or upon pausing operation of the ion exchange reactor. In some embodiments, multiple candle filters are inserted into the tank and when a filter fails, pumping through the filter is suspended while pumping through the other filters is maintained. In some embodiments, a presence of ion exchange particles in a tube or pipe connected to a filter is used to detect failure of the filter. In some embodiments, one or more pressure sensors are used to detect failure of a filter, particle trap, solid-liquid separation apparatus, or combinations thereof.

In some embodiments, the ion exchange material is contained in a compartment with filters that allow permeation of liquid solutions into the compartment. In some embodiments, the ion exchange material is contained in a rotating compartment. In some embodiments, the compartment may have baffled or other fixtures designed to guide liquid solutions through the compartment. In some embodiments, the reactor is a rotating bed reactor.

In some embodiments, the filter is a belt filter, plate-and-frame filter press, pressure vessel containing filter elements, rotary drum filter, rotary disc filter, cartridge filter, a centrifugal filter with a fixed or moving bed, a metal screen, a perforate basket centrifuge, a three-point centrifuge, a peeler type centrifuge, or a pusher centrifuge. In some embodiments, the filter may use a scroll or a vibrating device. In some embodiments, the filter is horizontal, vertical, or may use a siphon.

In some embodiments, a filter cake is prevented, limited, or removed by using gravity, centrifugal force, an electric field, vibration, brushes, liquid jets, scrapers, intermittent reverse flow, vibration, crow-flow filtration, or pumping suspensions across the surface of the filter. In some embodiments, the slurry of ion exchange particles and liquid is moved tangentially to the filter to limit cake growth. In some embodiments, gravitational, magnetic, centrifugal sedimentation, or other means of solid-liquid separation are used before, during, or after filtering to prevent cake formation.

In some embodiments, a filter comprises a screen, a metal screen, a sieve, a sieve bend, a bent sieve, a high frequency electromagnetic screen, a resonance screen, or combinations thereof.

In some embodiments, a deep bed filter is used to remove ion exchange particles from a liquid resource stream before it is reinjected into the ground.

Other Particle Traps

In some embodiments, one or more particle traps are a solid-liquid separation apparatus.

In some embodiments of the ion exchange reactor, one or more particle traps are external particle traps located externally to the tank. In some embodiments, a dilute slurry is removed from the tank, transferred to an external particle trap, and separated into a concentrated slurry and a solution with low or no suspended solids. In some embodiments, the concentrated slurry is returned to the tank or transferred to a different tank. In some embodiments, ion exchange particles are transferred from a brine tank to another brine tank, from an acid tank to another acid tank, from a washing tank to another washing tank, from a brine tank to a washing tank, from a washing tank to an acid tank, from an acid tank to a washing tank, or from an acid tank to a brine tank.

In some embodiments, the particle traps may use gravitational sedimentation. In some embodiments, the particle traps may include a settling tank, a thickener, a clarifier, a gravity thickener. In some embodiments, the particle traps are operated in batch mode, semi-batch mode, semi-continuous mode, or continuous mode. In some embodiments, the particle traps include a circular basin thickener with slurry entering through a central inlet such that the slurry is dispersed into the thickener with one or more raking components that rotate and concentrate the ion exchange particles into a zone where the particles can leave through the bottom of the thickener.

In some embodiments, the particle traps include a deep cone, a deep cone tank, a deep cone compression tank, or a tank wherein the slurry is compacted by weight. In some embodiments, the particle traps include a tray thickener with a series of thickeners oriented vertically with a center axle and raking components. In some embodiments, the particle traps include a lamella type thickener with inclined plates or tubes that may be smooth, flat, rough, or corrugated. In some embodiments, the particle traps include a gravity clarifier that may be a rectangular basin with feed at one end and overflow at the opposite end optionally with paddles and/or a chain mechanism to move particles.

In some embodiments, the particle traps use centrifugal sedimentation. In some embodiments, the particle traps may include a tubular centrifuge, a multi-chamber centrifuge, a conical basket centrifuge, a scroll-type centrifuge, a sedimenting centrifuge, or a disc centrifuge. In some embodiments, particles are discharged continuously or intermittently from the centrifuge. In some embodiments, the particle trap is a hydrocyclone. In some embodiments, the particle trap is an array of hydrocyclones or centrifuges in series and/or in parallel. In some embodiments, sumps are used to reslurry the ion exchange particles. In some embodiments, the hydrocyclones may have multiple feed points. In some embodiments, a hydrocyclone is used upside down. In some embodiments, liquid is injected near the apex of the cone of a hydrocyclone to improve sharpness of cut. In some embodiments, a weir rotates in the center of the particle trap with a feed of slurried ion exchange particles entering near the middle of the particle trap, and ion exchange particles get trapped at the bottom and center of the particle trap due to a "teacup effect".

In some embodiments, the particle trap may use magnetic separation. In some embodiments, the ion exchange particles are magnetic. In some embodiments, acid resistant magnetic particles such as $SiO_2$-coated magnetite or other coated or uncoated magnetic materials are attached to the surface of the ion exchange particles to enable magnetic separation.

In some embodiments, the particle trap is a collection of particle traps with similar or different mechanisms. In some embodiments, particle traps based on gravity, magnetism, centrifugal forces, or combinations thereof are located inside or outside the tank of the ion exchange reactor.

In some embodiments, the ion exchange particles are washed using counter-current flows of the ion exchange particles and a washing liquid. In some embodiments, the ion exchange particles are treated with brine or acid liquids using counter-current flows of the ion exchange particles and the liquids. In some embodiments, the counter-current washing of solids is performed using a series of particle traps or separators. In some embodiments, and additional particle trap or separator is located at the end of the liquid flow of the counter-current circuit to limit loss of particles. In some embodiments, counter-current washing is used to minimize use of fresh water.

Staged Flows

An aspect of the invention described herein is a staged ion exchange reactor for extracting lithium from liquid resources, comprising: a) a tank containing ion exchange particles with associated particle traps; b) one or more tanks containing brine at various stages of delithiation; and c) one or more tanks containing acid at various stages of lithiation.

An aspect of the invention described herein is a staged ion exchange reactor for extracting lithium from liquid resources, comprising: a) a tank containing ion exchange particles with associated particle traps; and b) one or more tanks containing brine at various stages of delithiation.

An aspect of the invention described herein is a staged ion exchange reactor for extracting lithium from liquid resources, comprising: a) a tank containing ion exchange particles with associated particle traps; and b) one or more tanks containing acid at various stages of lithiation.

In some embodiments, the staged ion exchange reactor contacts ion exchange particles that are saturated with hydrogen in contact with brine that is partially delithiated to maximize lithium recovery from the brine. In some embodiments, the staged ion exchange reactor contacts ion exchange particles that are saturated with lithium in contact with acid that is partially lithiated to maximize conversion of protons in the acid to lithium ions.

In some embodiments, the staged ion exchange reactor contacts ion exchange particles that are nearly saturated with lithium in contact with fresh brine to fully saturated the ion exchange particles with lithium and maximize lithium uptake by the particles. In some embodiments, the staged ion exchange reactor contacts ion exchange particles that are nearly saturated with protons in contact with fresh acid to fully saturated the ion exchange particles with protons and maximize lithium elution from the particles.

Interchange Network

In some embodiments, a plurality of ion exchange reactors are joined to form an interchange network comprising brine circuits, washing circuits, or acid circuits. In some embodiments of the brine circuit, brine flows through a first reactor in the brine circuit, then into a next reactor in the brine circuit, and so on, such that lithium is removed from the brine as the brine flows through one or more reactors. In some embodiments of the acid circuit, acid flows through a first reactor in the acid circuit, then into the next reactor in the acid circuit, and so on, such that lithium is eluted from the columns with acid to produce a lithium eluate. In some embodiments of the water washing circuit, water flows through a first reactor in the water washing circuit, then optionally into a next reactor in the water washing circuit, and so on, such that residual brine or other impurities are washed out. In some embodiments, particle traps are used to retain ion exchange particles within individual reactors in a circuit. In some embodiments, particle traps are used to move ion exchange particles in a counter-current direction through a series of reactors within the brine, washing, and/or acid circuits, or to move ion exchange particles between the different circuits.

In some embodiments of the interchange network, ion exchange reactors are interchanged between the brine circuit, the water washing circuit, and the acid circuit. In some embodiments, the first reactor in the brine circuit is loaded with lithium and then interchanged into the water washing circuit to remove residual brine. In some embodiments, the first reactor in the water washing circuit is washed to remove residual brine, and then interchanged to the acid circuit, where lithium is eluted with acid to form a lithium eluate. In some embodiments, the first reactor in the acid circuit is eluted with acid and then interchanged into the brine circuit to absorb lithium from the brine. In some embodiments, two water washing circuits are used to wash the reactors after both the brine circuit and the acid circuit. In some embodiments of the reactor interchange system, only one water washing circuit is used to wash the columns after the brine circuit, whereas excess acid is neutralized with base or washed out of the reactors in the brine circuit.

In some embodiments of the interchange network, the first reactor in the brine circuit is interchanged to become the last reactor in the water washing circuit. In some embodiments, the first reactor in the water washing circuit is interchanged to become the last reactor in the acid circuit. In some embodiments, the first reactor in the acid circuit is interchanged to become the last reactor in the brine circuit or the last reactor in a water washing circuit for acid removal.

Other Aspects

In some embodiments, flows of brine through the reactor are operated in batch, semi-batch, semi-continuous, or continuous modes of operation. In some embodiments, flows of washing solution through the reactor are operated in batch, semi-continuous, or continuous modes of operation. In some embodiments, flows of acid solution through the reactor are operated in batch, semi-continuous, or continuous modes of operation. In some embodiments, ion exchange particles are moved between a plurality of reactors. In some embodiments, ion exchange particles are moved between a plurality of reactors in an opposite direction to the flows of brine, washing solution, and acid.

In some embodiments, air pumps, water pumps, or vacuum pumps are used to move water, brine, acid, slurries, or other solutions. In some embodiments, a vacuum system is used to move water, brine, acid, slurries, or other solutions. In some embodiments, one or more tanks, columns, or other vessels are pressurized to move water, brine, acid, slurries, or other solutions. In some embodiments, one or more tanks, columns, or other vessels are pressurized to move water, brine, acid, or other solutions through a filter, particle trap, or other solid-liquid separation apparatus. In some embodiments, a vacuum is applied to filters in contact with the ion exchange material/fluid suspension to suck fluid out of the reactor while leaving the ion exchange material inside the reactor. In some embodiments, a vacuum valve is installed approximately 6 inches from the filter inside the line which is closed when the filter is to be backwashed. In some embodiments, a vacuum valve is installed approximately 4 inches from the filter inside the line which is closed when the filter is to be backwashed. In some embodiments, a vacuum valve is installed approximately 8 inches from the filter inside the line which is closed when the filter is to be backwashed. In some embodiments, for backwashing, pressurized air is pumped through the filter to break up the cake on the other side of the filter. In some embodiments, to resume filtering of the fluid from the suspension, the vacuum valve is opened again to re-expose the filter to vacuum. In some embodiments, a series of vacuum valves are used to minimize loss of vacuum from the vacuum/drainage lines.

In some embodiments, a washing solution is used to remove residual brine, residual acid, or other impurities from the ion exchange particles. In some embodiments, the washing solution is water, water with pH adjusted, an aqueous solution, or a non-aqueous solution. In some embodiments, ion exchange particles are removed from the tank and loaded into a column where they are washed. In some embodiments, ion exchange particles are removed from the tank and loaded into a column where they are washed to remove residual brine. In some embodiments, ion exchange particles are removed from the tank and loaded into a column where they are washed to remove residual acid. In some embodiments, the ion exchange particle form a packed bed, a settled bed, a fluidized bed, or combinations thereof. In some embodiments, the ion exchange particles are moved between a tank and a column. In some embodiments, the ion exchange particles are moved between a tank where they are fluidized and a column where they form a packed or settled bed. In some embodiments, one or more columns are directly attached to one or more tanks. In some embodiments, one or more columns are mounted at the bottom of one or more tanks so the ion exchange particles can settle from the tank into the column. In some embodiments, one or more columns are mounted at the bottom of one or more cone-bottom tanks so the ion exchange particles can settle from the tank into the column. In some embodiments, one or more columns are mounted at the bottom of one or more tanks so the ion exchange particles can settle from the tank into the column under the force of gravity and or with the flow of solution.

In some embodiments, a washing solution containing EDTA, disodium EDTA, or other anti-scalants is used to remove $CaSO_4$, $MgSO_4$, $SrSO_4$, $BaSO_4$, $MgCO_3$, $CaCO_3$, $BaCO_3$, $SrCO_3$, sulfate scale, carbonate scale, or other scale from the ion exchange reactor. In some embodiments, an anti-scalants wash is performed before or after each brine, water, or acid treatment. In some embodiments, an anti-scalants wash is performed after a number of ion exchange cycles that is less than about 10, less than about 50, or less than about 200.

In some embodiments, ion exchange particles are replaced from the reactor after the performance of these ion exchange particles has degraded in terms of lithium uptake capacity, lithium selectivity, lithium uptake kinetics, chemical stability, or mechanical stability. In some embodiments, ion exchange particles are replaced in one or more ion exchange reactors in a network of ion exchange reactors with minimal disruption to operations.

In some embodiments, base is added to the ion exchange reactor before, during, or after lithium uptake from a liquid resource. In some embodiments base is added as a solution, as an aqueous solution, as a component of a slurry, or as a solid. Base serves to neutralize protons release by the ion exchange material and maintain the pH of the liquid resource in a range of about 5-7, about 3-8, or about 1-9.

In some embodiments, the ion exchange reactor has a plunger, piston, or other mechanical device that compacts the ion exchange particles onto a filter while forcing liquid solution through the filter. In some embodiments, the ion exchange reactor is pressurized to force fluid through the filter at a higher rate. In some embodiments, a vacuum is used on the effluent side of the filter to promote higher filtration rates.

In some embodiments, flows of liquid resource, washing solution, or acid solution are recirculated through an ion exchange reactor. In some embodiments, recirculation of brine from the bottom of the reactor serves to create a fluidized bed, or partially fluidized bed, of ion exchange particles. In some embodiments, flows of acid, brine, water, or other solutions are injected at the bottom of the tank to fluidize or suspend ion exchange particles from the bottom of the tank. In some embodiments, flows of acid, brine, water, or other solutions are injected at the bottom of the tank and removed at the top of the tank. In some embodiments, flows of acid, brine, water, or other solutions are moved as part of a network of reactors and are injected at the bottom of the tank to fluidize or suspend ion exchange particles from the bottom of the tank. In some embodiments, flows of acid, brine, water, or other solutions are moved as part of a network of continuously-operated or semi-continuously-operated reactors and are injected at the bottom of the tank to fluidize or suspend ion exchange particles from the bottom of the tank.

In some embodiments, the ion exchange reactor is equipped with a spraying system to wash ion exchange particles off the internal surfaces of the tank and move the ion exchange particles to the bottom of the tank.

In some embodiments, lithium is eluted from the ion exchange particles using acid that is added all at once, titrated in various aliquots of similar or different concentrations. In some embodiments, lithium elution from the ion exchange particles are monitored or controlled using pH measurement and acid titration. In some embodiments, acid is added to a slurry comprising water and ion exchange particles, and the acid concentration added to the slurry is higher than the final acid concentration of the slurry after the acid is added.

In some embodiments, pH changes in the brine, acid, or water solutions are monitored to determine timing of lithium uptake, lithium elution, or washing processes.

In some embodiments, ion exchange particles are added or removed at the top or bottom of a tank or column in the ion exchange reactor. In some embodiments, brine, water, or acid solutions are added or removed at the top or bottom of a tank or column in the ion exchange reactor. In some embodiments, ion exchange particles are added to the top of a tank or column in the ion exchange reactor and may settled to the bottom. In some embodiments, ion exchange particles are added to the top of a tank or column in the ion exchange reactor and may settled to the bottom as brine moves upwards through the tank or column. In some embodiments, ion exchange particles are added to the top of a tank or column in the ion exchange reactor and may settle to the bottom at a rate that is controlled by the upward flow of brine, water, or acid solutions that are added at the bottom of the column and removed from the top of the column.

In some embodiments, the tank is comprised of a material that is a polymer, a metal, a ceramic, an alloy, stainless steel, a plastic-lined alloy, an oxide-lined alloy, fiberglass, composite materials, or combinations thereof. In some embodiments, the tank is comprised of PVDF, PE, PP, PVC, PTFE, other acid-resistant materials, or combinations thereof.

In some embodiments, the pH of the brine resource decreases when the brine resource is contacted with ion exchange particles due to lithium uptake and proton release by the ion exchange particles. In some embodiments, base is added to the liquid resource to control the pH in the range of about 5-7, about 4-8, or about 1-9. In some embodiments, the base is added as a solid, as a slurry, as a liquid solution, or as an aqueous solution. In some embodiments, the base may comprise CaO, $Ca(OH)_2$, $Mg(OH)_2$, NaOH, KOH, $Sr(OH)_2$, $Ba(OH)_2$, or combinations thereof.

In some embodiments of the ion exchange reactor or reactor system, flocculants are used to aid sedimentation or separation.

Ion Exchange Particles

In some embodiments, ion exchange particles are coated or uncoated ion exchange particles. In some embodiments, the ion exchange particles comprise an ion exchange material selected from the following list: $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl·xAl(OH)_3·yH_2O$, $SnO_2·xSb_2O_5·yH_2O$, $TiO_2·xSb_2O_5·yH_2O$, solid solutions thereof, and combinations thereof. In some embodiments, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In some embodiments, the ion exchange particles have a coating that comprises $Nb_2O_5$, $Ta_2O_5$, $MoO_2$, $TiO_2$, $ZrO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, a coating material comprises $TiO_2$, $ZrO_2$, $SiO_2$, $Li_2TiO_3$, $Li_2ZrO_3$, $Li_2MnO_3$, $ZrSiO_4$, $LiNbO_3$, or combinations thereof.

In some embodiments, the ion exchange particles are porous, non-porous, or composites. In some embodiments, the ion exchange particles are comprised of coated or uncoated ion exchange material embedded in a matrix. In some embodiments, the matrix is PVDF, polystyrene, other acid resistant polymer, ceramic binder, silica binder, or combinations thereof.

In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In some embodiments, the coated particle comprises an ion exchange material selected from the group consisting of $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof, and a coating material comprising $TiO_2$, $ZrO_2$, $SiO_2$, $Li_2TiO_3$, $Li_2ZrO_3$, $Li_2MnO_3$, $ZrSiO_4$, $LiNbO_3$, polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising n-methyl-2-pyrrolidone, dimethyl sulfoxide, tetrahydrofuran, dimethylformamide, dimethylacetamide, methyl ethyl ketone, ethanol, acetone, other solvents, or combinations thereof.

Liquid Resource

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, organic molecules, or other chemical or ionic species. In some embodiments, the liquid resource is optionally fed into the ion exchange reactor without any pre-treatment following from its source. In some embodiments, the liquid resource is injected into a reservoir, salt lake, salt flat, basin, or other geologic deposit after lithium has been removed from the liquid resource. In some embodiments, other species are recovered from the liquid resource before or after lithium recovery. In some embodiments, the pH of the liquid resource is adjusted before, during, or after lithium recovery.

Eluate Processing

In some embodiments, the lithium eluate solution that is yielded from the ion exchange reactor is further processed into lithium chemicals selected from the following list: lithium sulfate, lithium chloride, lithium carbonate, lithium phosphate, lithium hydroxide, lithium metal, lithium metal oxide, lithium metal phosphate, lithium sulfide, or combinations thereof. In some embodiments, the lithium eluate solution that is yielded from the ion exchange reactor is further processed into lithium chemicals that are solid, aqueous, liquid, slurry form, hydrated, or anhydrous.

In some embodiments, the lithium eluate solution that is yielded from the ion exchange reactor is further processed using acid recovery, acid recycling, acid regeneration, distillation, reverse osmosis, evaporation, purification, chemical precipitation, membrane electrolysis, or combinations thereof.

Methods

An aspect of the invention described herein is a method of generating a lithium eluate solution from a liquid resource, comprising: providing an ion exchange reactor comprising a tank, ion exchange particles that selectively absorb lithium from a liquid resource and elute a lithium eluate solution when treated with an acid solution after absorbing lithium ions from said liquid resource, one or more particle traps, and provision to modulate pH of said liquid resource; flowing a liquid resource into said ion exchange reactor thereby allowing said ion exchange particles to selectively absorb lithium from said liquid resource; treating said ion exchange particles with an acid solution to yield said lithium eluate solution; and passing said lithium eluate solution through said one or more particle traps to collect said lithium eluate solution.

An aspect of the invention described herein is a method of generating a lithium eluate solution from a liquid resource, comprising: providing an ion exchange reactor comprising (i) a tank with a conical shape, wherein said conical shape allows said ion exchange particles to settle into a settled bed so that liquid can be removed from above said settled bed; (ii) ion exchange particles that selectively absorb lithium from said liquid resource and elute said lithium eluate solution when treated with an acid solution after absorbing lithium from said liquid resource; (iii) one or more particle traps located at the bottom of said tank, wherein said one or more particle traps comprise one or more meshes; and (iv) provision to modulate pH of said liquid resource, wherein said modulation of said pH of said liquid resource is configured to occur in the tank or prior to injection of said liquid resource into the tank; flowing a liquid resource into said ion exchange reactor thereby allowing said ion exchange particles to selectively absorb lithium from said liquid resource; treating said ion exchange particles with an acid solution to yield said lithium eluate solution; and passing said lithium eluate solution through said one or more particle traps to collect said lithium eluate solution.

An aspect of the invention described herein is a method of generating a lithium eluate solution from a liquid resource, comprising: providing an ion exchange reactor comprising: (i) a tank with a conical shape, wherein said conical shape allows said ion exchange particles to settle into a settled bed so that liquid can be removed from above said settled bed; (ii) ion exchange particles that selectively absorb lithium from said liquid resource and elute said lithium eluate solution when treated with an acid solution after absorbing lithium from said liquid resource; (iii) one or more particle traps located at the bottom of said tank, wherein said one or more particle traps comprise multi-layered meshes; and (iv) provision to modulate pH of said liquid resource, wherein said modulation of said pH of said liquid resource is configured to occur in the tank or prior to injection of said liquid resource into the tank; flowing a liquid resource into said ion exchange reactor thereby allowing said ion exchange particles to selectively absorb lithium from said liquid resource; treating said ion exchange particles with an acid solution to yield said lithium eluate solution; and passing said lithium eluate solution through said one or more particle traps to collect said lithium eluate solution.

In some embodiments, the tank has a conical shape. In some embodiments, the tank has a partial conical shape. In some embodiments, the conical shape allows the ion exchange particles to settle into a settled bed so that liquid can be removed from above the settled bed. In some embodiments, the partial conical shape allows the ion exchange particles to settle into a settled bed so that liquid can be removed from above the settled bed.

In some embodiments, modulation of the pH of the liquid resource occurs in the tank. In some embodiment, modulation of the pH of the liquid resource occurs prior to injection into the tank. In some embodiments, one or more particle traps comprise one or more filters inside the tank. In some embodiments, one or more particle traps comprise one filter. In some embodiments, one or more particle traps comprise one filter. In some embodiments, one or more particle traps comprise two filters. In some embodiments, one or more particle traps comprise three filters. In some embodiments, one or more particle traps comprise four filters. In some embodiments, one or more particle traps comprise five filters.

In some embodiments, one or more particle traps is located at the bottom of the tank. In some embodiments, one or more particle traps is located close to the bottom of the tank. In some embodiments, one or more particle traps is located above the bottom of the tank.

In some embodiments, one or more particle traps comprise one or more meshes. In some embodiments, one or more particle traps comprises one mesh. In some embodiments, one or more particle traps comprises two meshes. In some embodiments, one or more particle traps comprises three meshes. In some embodiments, one or more particle traps comprises four meshes. In some embodiments, one or more particle traps comprises five meshes. In some embodiments, all the meshes of the one or more particle traps are identical. In some embodiments, at least one of the meshes of the one or more particle traps is not identical to the rest of the meshes of the one or more particle traps.

In some embodiments, one or more meshes comprise a pore space of less than about 200 microns, less than about 175 microns, less than about 150 microns, less than about 100 microns, less than about 75 microns, less than about 50 microns, less than about 25 microns, less than about 10 microns, more than about 1 micron, more than about 5 micron, more than about microns, more than about 20 microns, more than about 30 microns, more than about 40 microns, more than about 50 microns, more than about 60 microns, more than about 70 microns, more than about 80 microns, more than about 90 microns, more than about 100 microns, more than about 125 microns, more than about 150 microns, more than about 175 microns from about 1 micron to about 200 microns, from about 5 microns to about 175 microns, from about 10 microns to about 150 microns, from about 10 microns to about 100 microns, from about 10 microns to about 90 microns, from about 10 microns to about 80 microns, from about 10 microns to about 70 microns, from about 10 microns to about 60 microns, or from about 10 microns to about 50 microns.

In some embodiments, one or more particle traps comprise multi-layered meshes. In some embodiments, the multi-layered meshes comprise at least one finer mesh for filtration and at least one coarser mesh for structural support. In some embodiments, one or more particle traps comprise one or more meshes supported by a structural support. In some embodiments, one or more particle traps comprise one or more polymer meshes. In some embodiments, the one or more polymer meshes are selected from the group consisting of polyetheretherketone, ethylene tetrafluorethylene, polyethylene terephthalate, polypropylene, and combinations thereof.

In some embodiments, one or more particle traps comprise one or more meshes comprising a metal wire mesh. In some embodiments, the metal wire mesh is coated with a polymer. In some embodiments, the ion exchange reactor is configured to move said ion exchange particles into one or more columns for washing. In some embodiments, the ion exchange reactor is configured to allow the ion exchange particles to settle into one or more columns for washing. In some embodiments, the columns are affixed to the bottom of said tank. In some embodiments, the one or more particle traps comprise one or more filters mounted in one or more ports through the wall of said tank.

In some embodiments, the one or more particle traps comprise one or more filters external to said tank, and with provision for fluid communication between said one or more filters and said tank. In some embodiments, the one or more particle traps comprise one or more gravity sedimentation devices external to said tank, and with provision for fluid communication between said one or more gravity sedimentation devices and said tank.

In some embodiments, one or more particle traps comprise one or more gravity sedimentation devices internal to said tank. In some embodiments, one or more particle traps comprise one or more centrifugal sedimentation devices external to said tank, and with provision for fluid communication between said one or more centrifugal sedimentation devices and said tank In some embodiments, one or more particle traps comprise one or more centrifugal sedimentation devices internal to said tank. In some embodiments, one or more particle traps comprise one or more settling tanks, one or more centrifugal devices, or combinations thereof external to said tank, and with provision for fluid communication between said one or more settling tanks, centrifugal devices, or combinations thereof, and said tank. In some embodiments, one or more particle traps comprise one or more meshes, one or more centrifugal devices, or combinations thereof external to said tank, and with provision for fluid communication between said one or more meshes, centrifugal devices, or combinations thereof, and said tank. In some embodiments, one or more particle traps comprise one or more settling tanks, one or more meshes, or combinations thereof external to said tank, and with provision for fluid communication between said one or more settling tanks, meshes, or combinations thereof, and said tank. In some embodiments, one or more particle traps comprise one or more meshes, one or more settling tanks, one or more centrifugal devices, or combinations thereof external to said tank, and with provision for fluid communication between said one or more meshes, one or more settling tanks, centrifugal devices, or combinations thereof, and said tank.

In some embodiments, the ion exchange particles are stirred. In some embodiments, the ion exchange particles are stirred by a mixer. In some embodiments, the ion exchange particles are stirred by a propeller. In some embodiments, the ion exchange particles are fluidized by pumping solution into the tank near the bottom of the tank. In some embodiments, the ion exchange particles are fluidized by pumping solution from the tank back into the tank near the bottom of the tank. In some embodiments, the ion exchange particles are fluidized by pumping a slurry of the ion exchange particles from near the bottom of the tank to a higher level in the tank.

In some embodiments, the method further comprises one or more staged elution tanks, wherein intermediate eluate solutions comprising mixtures of protons and lithium ions are stored and used further to elute lithium from said ion exchange particles that are freshly lithiated. In some embodiments, the method further comprises one or more staged elution tanks, wherein intermediate eluate solutions comprising mixtures of protons and lithium ions are mixed with additional acid and used further to elute lithium from said ion exchange particles.

In some embodiments, the ion exchange particles further comprise a coating material. In some embodiments, the coating material is a polymer. In some embodiments, the coating of the coating material comprises a chloro-polymer, a fluoro-polymer, a chloro-fluoro-polymer, a hydrophilic polymer, a hydrophobic polymer, co-polymers thereof, mixtures thereof, or combinations thereof.

EXAMPLES

Example 1: Ion Exchange Reactor with Conical Bottom and Mounted Filters

Lithium is extracted from a brine using coated ion exchange particles. The brine is an aqueous solution containing 50,000 mg/L Na, 20,000 mg/L Ca, 3,000 mg/L Mg, and 500 ppm Li. The coated ion exchange particles are comprised of an ion exchange material and a coating material. The ion exchange material is $Li_4Mn_5O_{12}$ and the coating material is $ZrO_2$. The particles are comprised of 96 wt. % active material and 4 wt. % of coating material. The particles have a mean diameter of 30 microns, and the coating thickness is approximately 100 nm. The particles are created by first synthesizing $Li_4Mn_5O_{12}$ via a solid state method and then the coating is deposited on the surface of the $Li_4Mn_5O_{12}$ using Zr(IV) propoxide as a precursor.

The ion exchange particles are loaded into an ion exchange reactor shown in FIG. 1. The ion exchange reactor comprises a conical tank (101), a PEEK 12 um mesh mounted on a flange at an opening in the tank wall so that the mesh is approximately flush with the tank wall (102) fitted to a PVC tube to allow fluid to flow into and out of the tank through the mesh while the ion exchange particles and retained inside the tank, an overhead stirrer (103), a pH controller (104), and a spraying system (not shown) at the top of the tank with one or more nozzles positioned to spray water to wash ion exchange particles off the sides of the tank and down to the bottom of the tank.

The particles are loaded into the tank in an aqueous slurry. 1.5N $H_2SO_4$ acid is pumped into the tank through the PEEK mesh to create a slurry with $H_2SO_4$ at a normality of 0.75N. The acid is stirred with the ion exchange particle to yield $Li_2SO_4$ in solution. During acid treatment, the particles absorb hydrogen while releasing lithium. The $Li_4Mn_5O_{12}$ active material is converted to a protonated state with a hydrogen-enriched composition. The $ZrO_2$ coating allows diffusion of hydrogen and lithium respectively to and from the active material while providing a protective barrier that limits dissolution of manganese and oxygen from the active material. After 40 minutes, the eluate solution is collected from the tank through the PEEK mesh for elemental analysis to measure the eluate composition.

After treatment in acid, the protonated particles are treated with brine wherein the particles absorb lithium while releasing hydrogen. The brine is pumped into the tank through the PEEK mesh. The particles are converted from a protonated state to a lithiated state with a lithium-enriched composition. An aqueous solution of NaOH is added to the tank to maintain the pH of the brine at 6. After 4 hours, the spent brine is removed from the tank through the PEEK mesh. The ion exchange particles are then washed with water through the spraying system. The particles are washed three times with water, and the water is drained from the tank through the PEEK mesh, leaving an aqueous slurry of the ion exchange particles at the bottom of the tank.

The lithiated material is then treated again with acid to yield lithium in solution as described previously. The cycle of protonation and lithiation is repeated to extract lithium from the brine and yield a $Li_2SO_4$ solution. Dissolution and degradation of the active material in acid is limited due to the coating providing a protective barrier. Dissolution of the active material is measured by through elemental analysis of the acid solution following stirring. After 25 ion exchange cycles, there is no measurable loss of lithium uptake capacity in the ion exchange material and lithium recovery from the brine solution is approximately 65% for each cycle.

Example 2: Ion Exchange Reactor with Conical Bottom and Internal Filters

Lithium is extracted from a brine using coated ion exchange particles. The brine is an aqueous solution containing 50,000 mg/L Na, 20,000 mg/L Ca, 3,000 mg/L Mg, and 500 ppm Li. The coated ion exchange particles are comprised of an ion exchange material and a coating material. The ion exchange material is $Li_4Mn_5O_{12}$ and the coating material is $SiO_2$. The particles are comprised of 94 wt. % active material and 6 wt. % of coating material. The particles have a mean diameter of 30 microns, and the coating thickness is approximately 400 nm. The particles are created by first synthesizing $Li_4Mn_5O_{12}$ via a solid state method and then the coating is deposited on the surface of the $Li_4Mn_5O_{12}$ using tetraethyl orthosilicate (TEOS) as a precursor.

Figure 2:
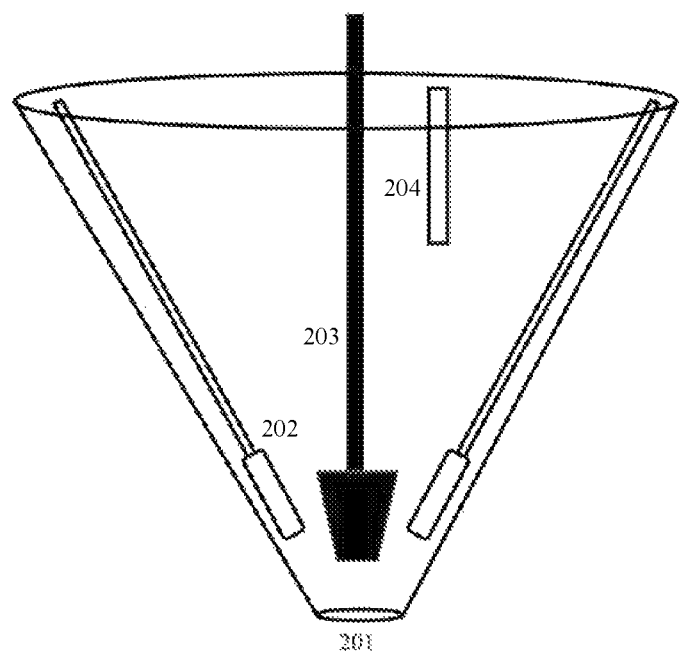
FIG. 2 illustrates an ion exchange reactor comprising a stirred tank having a conical shape and one or more filters inside the tank.

The ion exchange particles are loaded into an ion exchange reactor shown in FIG. 2. The ion exchange reactor comprises a conical tank (201), two internal candle filters comprising a PEEK 12 um mesh (202) fitted to a PVC pipe to allow fluid to flow into and out of the tank through the mesh while the ion exchange particles are retained inside the tank, an overhead stirrer (203), a pH controller (204), and a spraying system (not shown) at the top of the tank with one or more nozzles positioned to spray water to wash ion exchange particles off the sides of the tank and down to the bottom of the tank.

The particles are loaded into the tank in an aqueous slurry. 1.5N HCl acid is pumped into the tank through the PEEK mesh to create a slurry with HCl at a normality of 0.75N. The acid is stirred with the ion exchange particle to yield LiCl in solution. During acid treatment, the particles absorb hydrogen while releasing lithium. The $Li_4Mn_5O_{12}$ active material is converted to a protonated state with a hydrogen-enriched composition. The $SiO_2$ coating allows diffusion of hydrogen and lithium respectively to and from the active material while providing a protective barrier that limits dissolution of manganese and oxygen from the active material. After 40 minutes, the eluate solution is collected from the tank through the PEEK mesh for elemental analysis to measure the eluate composition.

After treatment in acid, the protonated particles are treated with brine wherein the particles absorb lithium while releasing hydrogen. The brine is pumped into the tank through an opening in the top of the tank. The particles are converted from a protonated state to a lithiated state with a lithium-enriched composition. An aqueous solution of NaOH is added to the tank to maintain the pH of the brine at 7. After 6 hours, the spent brine is removed from the tank through the PEEK mesh. The ion exchange particles are then washed with water through the spraying system. The particles are washed three times with water, and the water is drained from the tank through the PEEK mesh, leaving an aqueous slurry of the ion exchange particles at the bottom of the tank.

The lithiated material is then treated again with acid to yield lithium in solution as described previously. The cycle of protonation and lithiation is repeated to extract lithium from the brine and yield a LiCl solution. Dissolution and degradation of the active material in acid is limited due to the coating providing a protective barrier.

Example 3: Ion Exchange Reactor with Conical Bottom and External Filter

Lithium is extracted from a brine using coated ion exchange particles. The brine is an aqueous solution containing 70,000 mg/L Na, 1,000 mg/L Ca, 5,000 mg/L Mg, and 200 ppm Li. The coated ion exchange particles are comprised of an ion exchange material and a coating material. The ion exchange material is $Li_4Mn_5O_{12}$ and the coating material is $ZrO_2$. The particles are comprised of 96 wt. % active material and 4 wt. % of the coating. The particles have a mean diameter of 30 microns, and the coating thickness is approximately 100 nm. The particles are created by first synthesizing $Li_4Mn_5O_{12}$ via solid state method and then the coating is deposited on the surface of the $Li_4Mn_5O_{12}$ using Zr(IV)-propoxide as a precursor.

Figure 3:
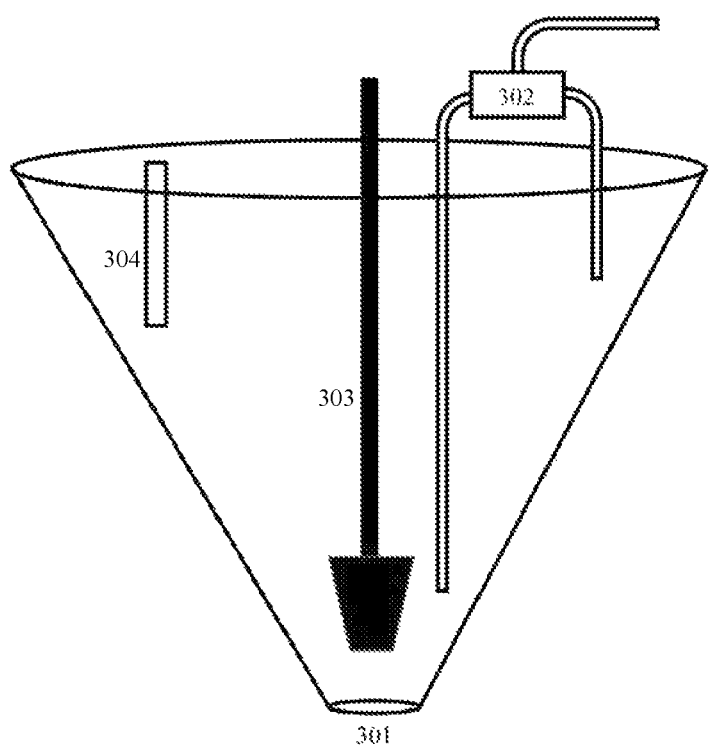
FIG. 3 illustrates an ion exchange reactor comprising a stirred tank having a conical shape and one or more filters external to the tank, with provision for fluid communication between the one or more filters and tank.

The ion exchange particles are loaded into an ion exchange reactor shown in FIG. 3. The ion exchange reactor comprises a conical tank (301), an external settling tank (302) with an inlet taking dilute slurry from the tank and one outlet returning concentrated slurry to the tank and another outlet removing liquid from the system, an overhead stirrer (303), a pH controller (304), and a spraying system (not shown) at the top of the tank with one or more nozzles positioned to spray water to wash ion exchange particles off the sides of the tank and down to the bottom of the tank.

The particles are loaded into the tank in an aqueous slurry. 1.5N $H_2SO_4$ acid is pumped into the tank to create a slurry with $H_2SO_4$ at a normality of 0.75N. The acid is stirred with the ion exchange particle to yield $Li_2SO_4$ in solution. During acid treatment, the particles absorb hydrogen while releasing lithium. The $Li_4Mn_5O_{12}$ active material is converted to a protonated state with a hydrogen-enriched composition. The $ZrO_2$ coating allows diffusion of hydrogen and lithium respectively to and from the active material while providing a protective barrier that limits dissolution of manganese and oxygen from the active material. After 40 minutes, the eluate solution is collected from the tank through the settling tank for elemental analysis to measure the eluate composition.

After treatment in acid, the protonated particles are treated with brine wherein the particles absorb lithium while releasing hydrogen. The particles are converted from a protonated state to a lithiated state with a lithium-enriched composition. An aqueous solution of NaOH is added to the tank to maintain the pH of the brine at 6. After 4 hours, the spent brine is removed from the tank through the settling tank. The ion exchange particles are then washed with water through the spraying system. The particles are washed three times with water, and the water is drained from the tank through the settling tank, leaving a concentrated aqueous slurry of the ion exchange particles at the bottom of the tank.

The lithiated material is then treated again with acid to yield lithium in solution as described previously. The cycle of protonation and lithiation is repeated to extract lithium from the brine and yield a $Li_2SO_4$ solution.

Example 4: Ion Exchange Reactor with External Settling Tank

Lithium is extracted from a brine using ion exchange particles. The brine is an aqueous solution containing 70,000 mg/L Na, 1,000 mg/L Ca, 5,000 mg/L Mg, and 200 ppm Li. The ion exchange particles are comprised of an ion exchange material that is $Li_4Mn_5O_{12}$. The particles have a mean diameter of 30 microns. The $Li_4Mn_5O_{12}$ is synthesized via a solid state method.

Figure 4:
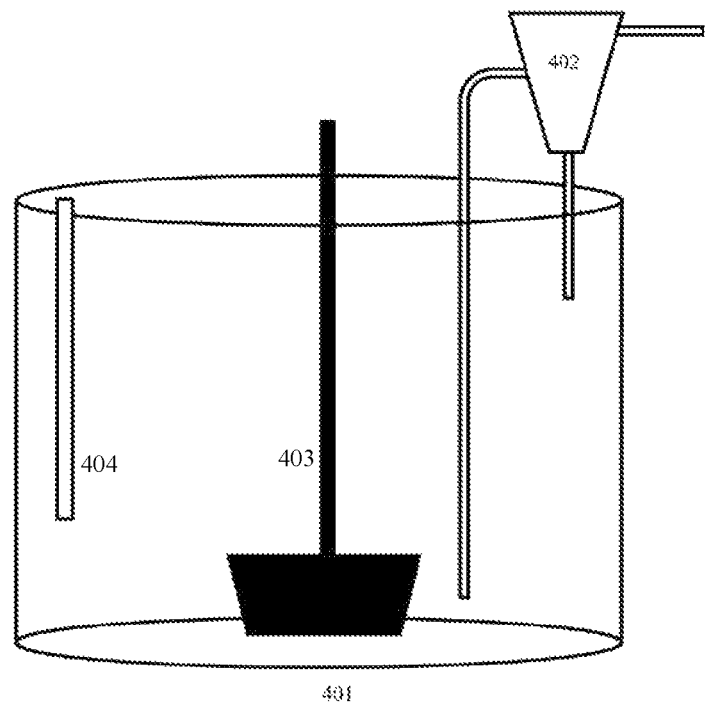
FIG. 4 illustrates an ion exchange reactor comprising a stirred tank and an external conical-shaped settling tank, with provision for fluid communication between the settling tank and the tank.

The ion exchange particles are loaded into an ion exchange reactor shown in FIG. 4. The ion exchange reactor comprises a cylindrical tank (401), an external settling tank (402) with an inlet taking dilute slurry from the tank and one outlet returning concentrated slurry to the tank and another outlet removing liquid from the system, an overhead stirrer (403), a pH controller (404), and a spraying system (not shown) at the top of the tank with one or more nozzles positioned to spray water to wash ion exchange particles off the sides of the tank and down to the bottom of the tank.

The particles are loaded into the tank in an aqueous slurry. 1.5N $H_2SO_4$ acid is pumped into the tank to create a slurry with $H_2SO_4$ at a normality of 0.75N. The acid is stirred with the ion exchange particle to yield $Li_2SO_4$ in solution. During acid treatment, the particles absorb hydrogen while releasing lithium. The $Li_4Mn_5O_{12}$ active material is converted to a protonated state with a hydrogen-enriched composition. After 40 minutes, the eluate solution is collected from the tank through the settling tank for elemental analysis to measure the eluate composition.

After treatment in acid, the protonated particles are treated with brine wherein the particles absorb lithium while releasing hydrogen. The particles are converted from a protonated state to a lithiated state with a lithium-enriched composition. An aqueous solution of NaOH is added to the tank to maintain the pH of the brine at 6. After 4 hours, the spent brine is removed from the tank through the settling tank. The ion exchange particles are then washed with water through the spraying system. The particles are washed three times with water, and the water is drained from the tank through the settling tank, leaving a concentrated aqueous slurry of the ion exchange particles at the bottom of the tank.

The lithiated material is then treated again with acid to yield lithium in solution as described previously. The cycle of protonation and lithiation is repeated to extract lithium from the brine and yield a $Li_2SO_4$ solution.

Example 5: Ion Exchange System with External Filters

Lithium is extracted from a brine using ion exchange particles. The brine is an aqueous solution containing 70,000 mg/L Na, 1,000 mg/L Ca, 5,000 mg/L Mg, and 200 ppm Li. The ion exchange particles are comprised of an ion exchange material that is $Li_4Mn_5O_{12}$. The particles have a mean diameter of 30 microns. The $Li_4Mn_5O_{12}$ is synthesized via a solid state method.

Figure 5:
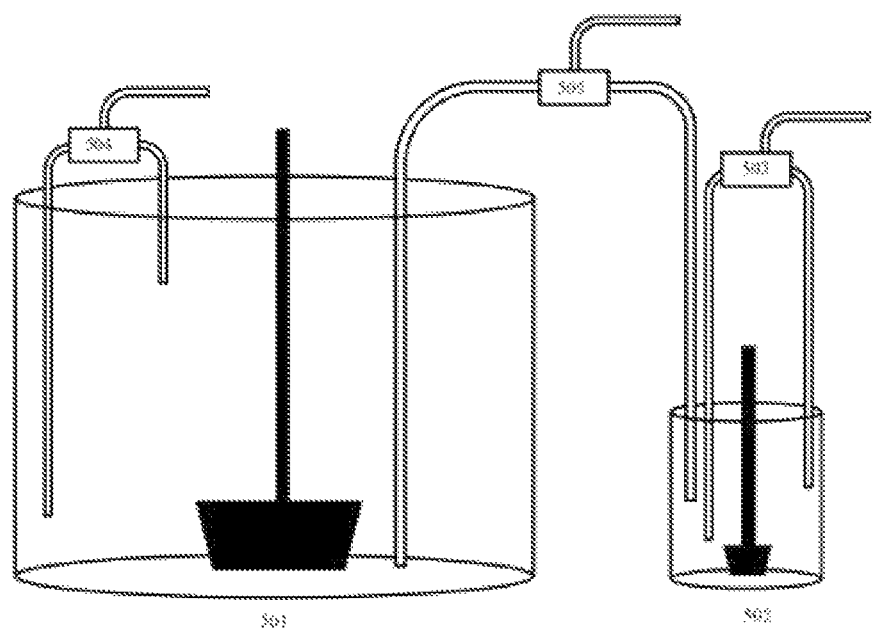
FIG. 5 illustrates an ion exchange system comprising a networked plurality of stirred tanks, and one or more filters external to the tanks.

The ion exchange particles are loaded into an ion exchange reactor shown in FIG. 5. The ion exchange reactor comprises a larger cylindrical brine tank for brine mixing and water washing (501), a smaller cylindrical acid tank for acid mixing (502), a settling tank for removing liquid from the acid tank (503), a settling tank for removing liquid from the brine tank (504), and a settling tank for moving the ion exchange particles between the acid tank and the brine tank (505) while removing water to form a more concentrated slurry prior to acid elution. Each tank is fitted with an overhead stirrer, a pH controller (not shown), and a spraying system (not shown) at the top of the tank with one or more nozzles positioned to spray water to wash ion exchange particles off the sides of the tank and down to the bottom of the tank.

The particles are loaded into the acid tank in an aqueous slurry. 1.5N HCl acid is pumped into the tank to create a slurry with HCl at a normality of 0.75N HCl. The acid is stirred with the ion exchange particles to yield LiCl in solution. During acid treatment, the particles absorb hydrogen while releasing lithium. The $Li_4Mn_5O_{12}$ active material is converted to a protonated state with a hydrogen-enriched composition. After 30 minutes, the slurry of acidic eluate and ion exchange particles is separated into a concentrated slurry and an eluate solution using an external settling tank (503). The concentrated slurry is reinjected into the acid tank for washing. Then the slurry is washed with water using the external settling tank (503) to remove a majority of the water. Then the slurry is transferred to the brine tank using an external settling tank (505) while removing some water containing residual acid.

In the brine tank, the protonated particles are treated with brine wherein the particles absorb lithium while releasing hydrogen. The particles are converted from a protonated state to a lithiated state with a lithium-enriched composition. An aqueous slurry of Ca(OH) 2 is added to the tank to maintain the pH of the brine at 7. After 6 hours, the spent brine is removed from the tank through the settling tank (504) while the ion exchange particles are returned to the brine tank. The ion exchange particles are then washed with water through the spraying system. The particles are washed three times with water, and the water is removed using the external settling tank (504) connected to the brine tank, leaving an aqueous slurry of the ion exchange particles at the bottom of the tank. The slurry is then moved to the acid tank through an external settling tank (505) while removing excess water to increase the concentration of the slurry being loaded into the acid tank.

The lithiated material is then treated again with acid to yield lithium in solution as described previously. The cycle of protonation and lithiation is repeated to extract lithium from the brine and yield a LiCl solution.

Example 6: Ion Exchange System with Multiple Brine Reactors Sharing One Acid Reactor Lithium is extracted from a brine using ion exchange particles. The brine is an aqueous solution containing 60,000 mg/L Na, 20,000 mg/L Ca, 5,000 mg/L Mg, and 120 ppm Li. The ion exchange particles are comprised of an ion exchange material that is $Li_4Mn_5O_{12}$. The particles have a mean diameter of 40 microns. The $Li_4Mn_5O_{12}$ is synthesized via a solid state method.

Figure 6:
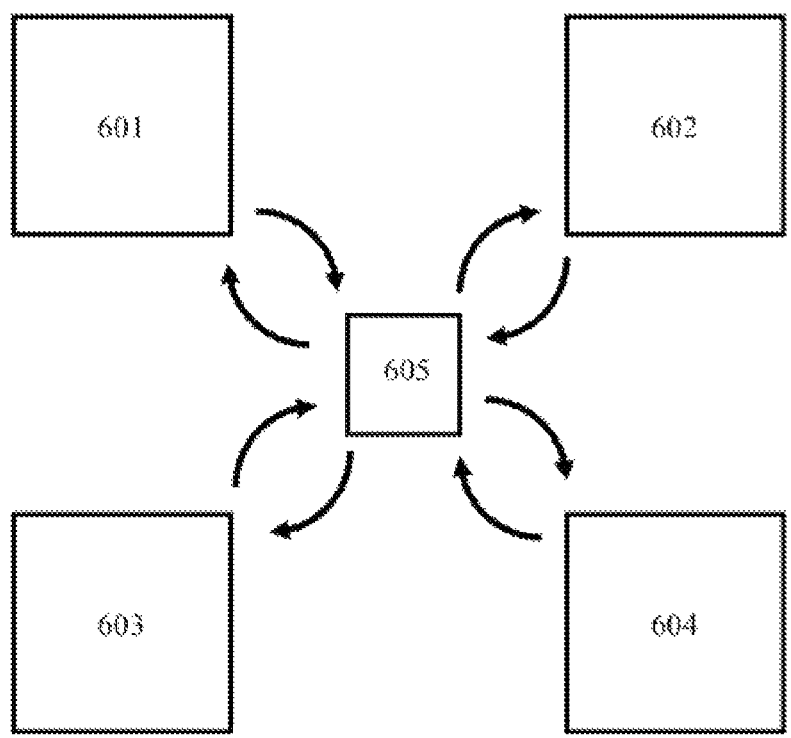
FIG. 6 illustrates an ion exchange system comprising a networked plurality of tanks including multiple brine reactors networked with one acid reactor.

The ion exchange particles are loaded into an ion exchange system shown in FIG. 6. The ion exchange system comprises four brine reactors for brine mixing and water washing (601, 602, 603, 604) with large conical tanks incorporating internal candle filters, overhead stirrers, and pH controllers; and one acid reactor for acid elution (605) with a smaller conical tank incorporating internal candle filters and an overhead stirrer. Each tank is fitted with a spraying system at the top of the tank with one or more nozzles positioned to spray washing solution to wash ion exchange particles off the sides of the tanks and down to the bottom of the tanks while removing soluble species from the tank.

In the brine tanks, the protonated particles are treated with brine wherein the particles absorb lithium while releasing hydrogen. The particles are converted from a protonated state to a lithiated state with a lithium-enriched composition. An aqueous slurry of $Ca(OH)_2$ is added to the tank to maintain the pH of the brine at 6.5. The lithium uptake from brine is staggered in time between the reactors with each brine reactor starting lithium uptake approximately two hours after the next. After each brine reactor has stirred the ion exchange particles in brine for eight hours, the depleted brine is removed through the candle filters. Then, the ion exchange particles are washed five times with water where the water is removed through the candle filters. Then the remaining slurry of water and ion exchange particles is transferred to the acid reactor.

The particles are loaded into the acid tank in an aqueous slurry. 1.5N HCl acid is pumped into the tank to create a slurry with HCl at a normality of 0.75N. Additional 1.5N HCl acid solution is added to the tank during elution to stimulate further lithium elution from the ion exchange particles. The acid is stirred with the ion exchange particle to yield a LiCl eluate solution. During acid treatment, the particles absorb hydrogen while releasing lithium. The $Li_4Mn_5O_{12}$ active material is converted to a protonated state with a hydrogen-enriched composition. After 45 minutes, the acid eluate is removed through the candle filters and sent to an eluate processing unit to form battery-grade lithium carbonate. The remaining acidic slurry is washed with water once, and the water is removed through the candle filters. Then the slurry is transferred to the brine tank. After the slurry has been transferred back to the brine tank, the next brine reactor is washed and the slurry from that next brine reactor is transferred to the acid reactor for elution.

Example 7: Continuous Ion Exchange System with Multiple Reactors

Lithium is extracted from a brine using ion exchange particles. The brine is an aqueous solution containing 70,000 mg/L Na, 30,000 mg/L Ca, 4,000 mg/L Mg, and 80 ppm Li. The ion exchange particles are comprised of an ion exchange material that is $Li_4Mn_5O_{12}$. The particles have a mean diameter of 30 microns. The $Li_4Mn_5O_{12}$ is synthesized via s solid state method.

Figure 7:
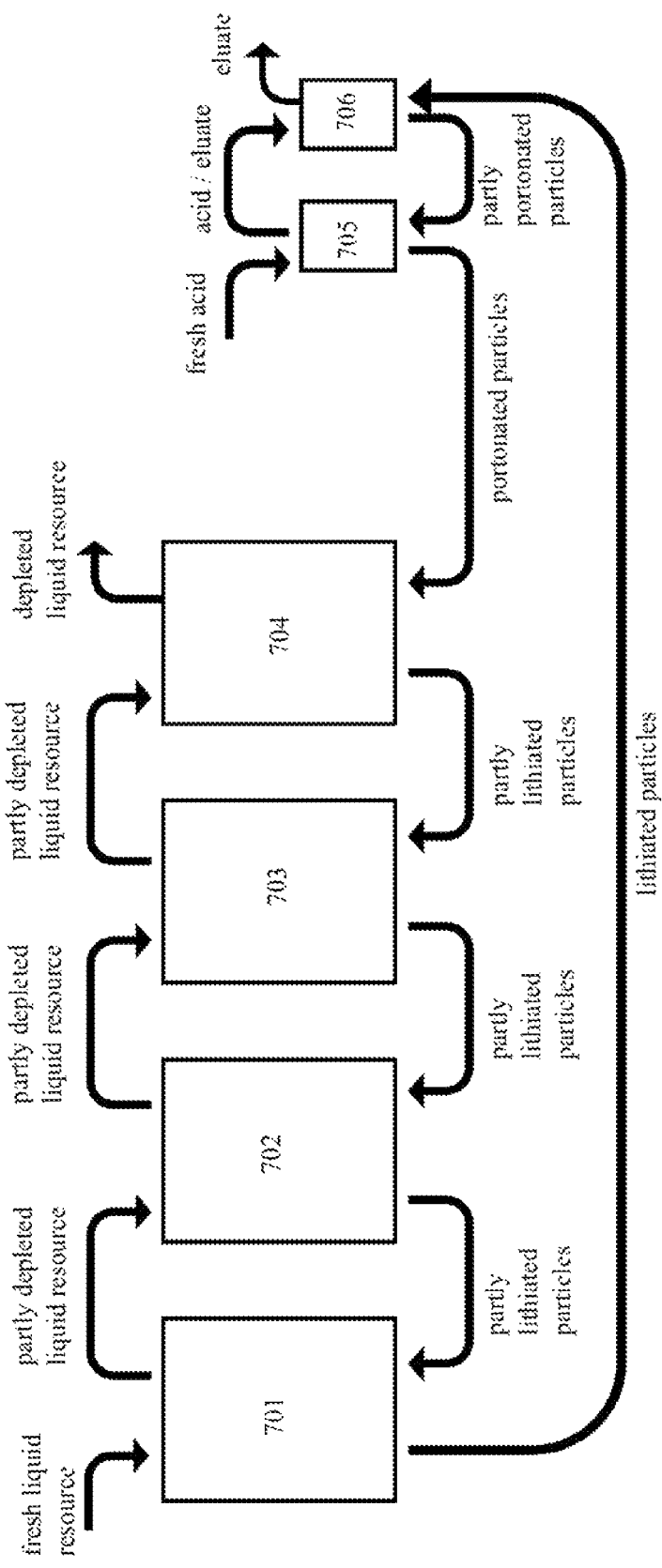
FIG. 7 illustrates an ion exchange system comprising a networked plurality of tanks where ion exchange particles move against a countercurrent flow of brine, washing solution, and acid and the system is configured to operate continuously or semi-continuously.

The ion exchange particles are loaded into an ion exchange system shown in FIG. 7. The ion exchange system comprises a brine circuit comprising four brine reactors for brine mixing and water washing (701, 702, 703, 704) incorporating large conical tanks, external settling tanks, overhead stirrers, and pH controllers; a water washing circuit; and an acid circuit comprising two acid reactors for acid elution (705, 706) incorporating smaller conical tanks, external settling tanks, and overhead stirrers. Each tank is fitted with a spraying system at the top of the tank with one or more nozzles positioned to spray aqueous washing solution to wash ion exchange particles off the sides of the tanks and down to the bottom of the tanks.

In the brine tanks, the protonated particles are treated with brine wherein the particles absorb lithium while releasing hydrogen. The particles are converted from a protonated state to a lithiated state with a lithium-enriched composition. An aqueous slurry of Ca(OH) 2 is added to the tank to maintain the pH of the brine at 6.5. The brine flows continuously through the series of four brine reactors as the ion exchange particles flow in the counter-current direction. The ion exchange particles move in an aqueous slurry. The brine and ion exchange particles are separated using the external settling tanks. The correct relative velocities of brine and ion exchange particles through the system is maintained by reinjecting brine or ion exchange particles back into a reactor from which they are removed as needed. When the ion exchange particles reach the end of the brine circuit, they are transferred to a water washing circuit where residual brine is removed from the particles. Excess water is removed after washing through a filter to form a concentrated slurry that is transferred to the acid circuit.

The particles are then transferred into the acid circuit. The particles move through the acid circuit while acid solution enters the acid circuit at the other end of the circuit and moves through the acid circuit in a counter-current direction. The external settling tanks are using to separate the ion exchange particles from the acid eluate. 1.5N HCl acid is pumped into the tank where the acid solution enters the acid circuit to create a slurry with HCl at a normality of 0.75N. The ion exchange particles release lithium into the acid solution to form an acid-eluate solution. The acid-eluate solution is transferred to the next acid reactor, where the acid-eluate solution is further converted to an eluate solution. The eluate solution is removed from the acid circuit and processed to form battery-grade lithium hydroxide via membrane electrolysis. The ion exchange particles leaving the acid circuit are washed in a washing circuit and returned to the start of the brine circuit.

Example 8: Ion Exchange Reactor with Staged Elution

Lithium is extracted from a brine using coated ion exchange particles. The brine is an aqueous solution containing 70,000 mg/L Na, 12,000 mg/L Ca, 3,000 mg/L Mg, and 200 ppm Li. The coated ion exchange particles are comprised of an ion exchange material and a coating material. The ion exchange material is $Li_4Mn_5O_{12}$ and the coating material is $SiO_2$. The particles are comprised of 94 wt. % active material and 6 wt. % of coating material. The particles have a mean diameter of 30 microns, and the coating thickness is approximately 400 nm. The particles are created by first synthesizing $Li_4Mn_5O_{12}$ via a solid state method and then the coating is deposited on the surface of the $Li_4Mn_5O_{12}$ using TEOS as a precursor.

Figure 8:
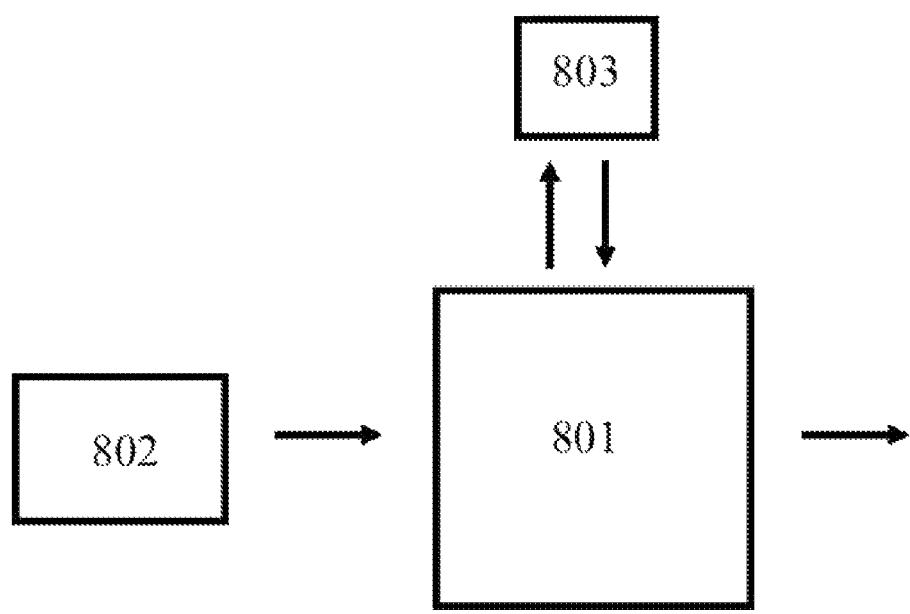
FIG. 8 illustrates an ion exchange reactor with provision for a series of staged elution tanks, wherein intermediate eluate solutions comprising a mixture of protons and lithium ions are stored and used further to elute lithium from the ion exchange particles.

The ion exchange particles are loaded into an ion exchange system shown in FIG. 8. The ion exchange system comprises an ion exchange reactor (801) comprising an array of internal candle filters with PEEK 12 um mesh fitted to a PVC pipe to allow fluid to flow into and out of the tank through the mesh while the ion exchange particles and retained inside the tank, an overhead stirrer, a pH controller, and a spraying system at the top of the tank with multiple nozzles to spray water to wash ion exchange particles off the sides of the tank and down to the bottom of the tank; an acid feed tank (802); and a staged eluate tank (803).

The reactor is operator as described in Example 2, but during elution, the ion exchange particles that are saturated with lithium are first eluted with an acid-eluate solution that is an approximately 50/50 mixture of lithium ions and protons so that the acid-eluate solution is converted to an eluate solution with 90% lithium ions and only 10% protons, maximizing conversion of the protons to lithium ions. The eluate solution is removed from the tank and further processed into battery-grade lithium hydroxide. Then, fresh acid is flowed into the tank, converted to an acid-eluate solution that is an approximately 50/50 mixture of lithium ions and protons, and this acid-eluate solution is then flowed into the stage eluate tank for storage until the next elution step. The ion exchange particles are washed with water, treated with brine with pH controlled at 6.5, washed with water again, and then returned to elution as described above.

Example 9: Ion Exchange Reactor

Lithium was extracted from a brine using coated ion exchange particles. The brine was an aqueous solution containing 100,000 mg/L Na and 300 ppm Li. The particles were comprised of 85 wt. % active material and 15 wt. % of coating material. The particles had a mean diameter of 40 microns.

Figure 9A:
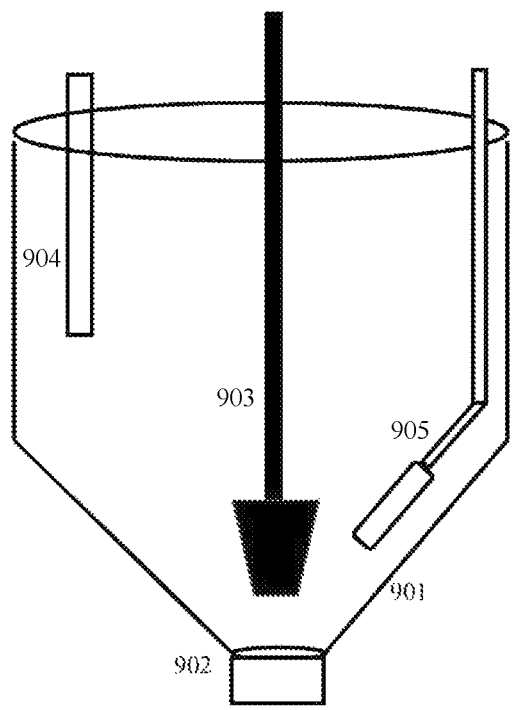
FIG. 9A illustrates an ion exchange reactor comprising a stirred tank having a partial conical shape and one or more filters inside the tank.

The ion exchange particles were loaded into an ion exchange reactor shown in FIG. 9A. The ion exchange reactor comprised a cone-bottom tank (901), a polyetheretherketone 12 micron pore size mesh mounted at the bottom of the cone-bottom of the tank (902) to allow fluid to be pumped into and out of the tank through the mesh while the ion exchange particles are retained inside the tank, an overhead stirrer (903), a pH controller (904), an internal filter comprising a polyetheretherketone 35 micron pore size mesh (905), and a spraying system (not shown) at the top of the tank with one or more nozzles positioned to spray water to wash ion exchange particles off the sides of the tank and down to the bottom of the tank.

The particles were loaded into the tank as a dry material. 2.0 N HCl acid was pumped into the tank and stirred with the ion exchange particle to yield a LiCl eluate solution. During acid treatment, the particles absorbed hydrogen while releasing lithium. The active material was converted to a protonated state with a hydrogen-enriched composition. The coating allowed diffusion of hydrogen and lithium respectively to and from the active material while providing a protective barrier that protects the active material. After 40 minutes, the eluate solution was collected from the tank through the meshes, dewatered, purified using sodium carbonate precipitation and resin ion exchange beads to remove trace Mg/Ca, and processed into lithium carbonate through addition of sodium carbonate solution at 90 degrees Celsius.

After treatment in acid, the protonated particles were treated with brine wherein the particles absorb lithium while releasing hydrogen. The brine was pumped into the tank and stirred with the ion exchange particles, and the particles are converted from a protonated state to a lithiated state with a lithium-enriched composition. An aqueous solution of NaOH was added to the tank to maintain the pH of the brine at 6. After 4 hours, the spent brine is removed from the tank through the meshes. The ion exchange particles were then washed with water through the spraying system. The particles were washed three times with water, and the water was drained from the tank through the meshes, leaving a moist bed of the ion exchange particles at the bottom of the tank with low water content.

Figure 9B:
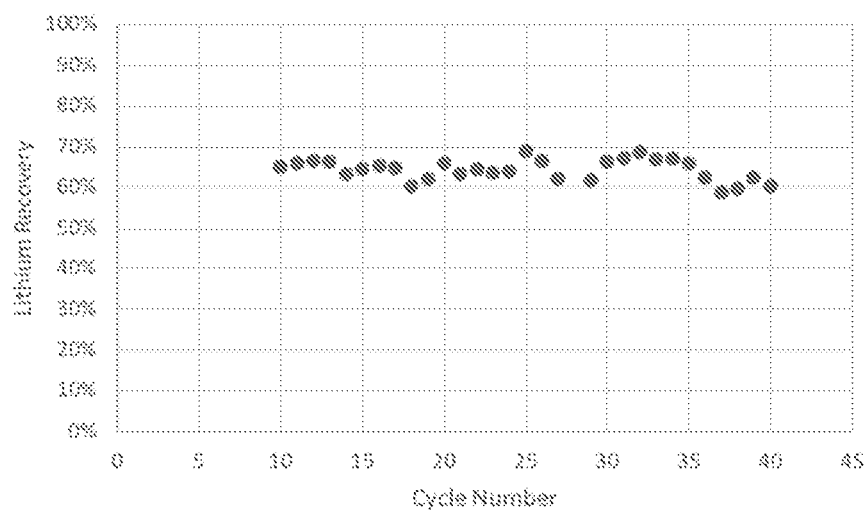
FIG. 9B depicts lithium recovery from a liquid resource over multiple cycles between the liquid resource and acid using the ion exchange reactor illustrated in FIG. 9A.

The lithiated material was then treated again with acid to yield lithium in solution as described previously. The cycle of protonation and lithiation was repeated to extract lithium from the brine and yield a LiCl solution. Degradation of the ion exchange particles was limited due to the coating providing a protective barrier. FIG. 9B shows lithium recovery (the amount of lithium yielded in the LiCl solution as a percentage of the total lithium in the brine) from the brine over multiple cycles between brine and acid.

Example 10: Ion Exchange Reactor with Attached Column

Lithium is extracted from a brine using coated ion exchange particles. The brine is an aqueous chloride solution containing 100,000 mg/L Na, 200 ppm Li, and other species including Ca, Mg, and B. The coated ion exchange particles are comprised of an ion exchange material and a coating material. The ion exchange material is $Li_2MnO_3$ and the coating material is titanium dioxide. The particles are comprised of 95 wt. % active material and 5 wt. % of coating material. The particles have a mean diameter of 200 microns. The particles are created by first synthesizing $Li_2MnO_3$ via a solid state method and then the coating is deposited from a Ti-propoxide precursor onto the surface of the $Li_2MnO_3$ material.

Figure 10:
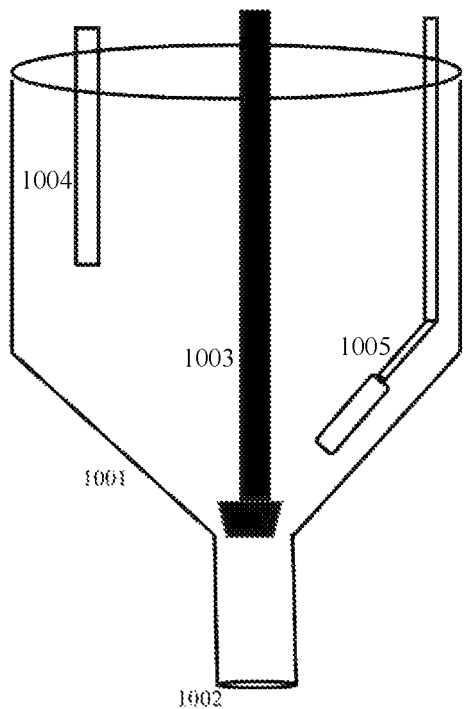
FIG. 10 illustrates an ion exchange reactor comprising a stirred tank having a partial conical shape ending in a thinner cylindrical column with one or more filters inside the tank.

The ion exchange particles are loaded into an ion exchange reactor shown in FIG. 10. The ion exchange reactor comprises a cone-bottom tank with a thinner cylindrical column connected and mounted at the bottom of the cone-bottom tank (1001), a polypropylene 100 um mesh mounted at the bottom of the column (1002) to allow fluid to be pumped into and out of the tank through the mesh while the ion exchange particles are retained inside the tank, an overhead stirrer (1003), a pH controller (1004), an internal filter comprising a polypropylene 100 micron pore size mesh (1005), and a spraying system (not shown) at the top of the tank with one or more nozzles positioned to spray water to wash ion exchange particles off the sides of the tank and down to the bottom of the tank.

The particles are loaded into the tank as a dry material. 1.5 N sulfuric acid is pumped into the tank and stirred with the ion exchange particle to yield a lithium sulfate eluate solution. During acid treatment, the particles absorb hydrogen while releasing lithium. The coating allows diffusion of hydrogen and lithium respectively to and from the active material while providing a protective barrier that protects the active material. After 40 minutes, the eluate solution is collected from the tank through the mesh, dewatered, purified using sodium carbonate precipitation and resin ion exchange beads to remove trace Mg/Ca, and processed into lithium carbonate through addition of sodium carbonate solution at 90 degrees Celsius.

After treatment in acid, the protonated particles are treated with brine wherein the particles absorb lithium while releasing hydrogen. The brine is pumped into the tank and stirred with the ion exchange particles, and the particles are converted from a protonated state to a lithiated state with a lithium-enriched composition. An aqueous solution of NaOH is added to the tank to maintain the pH of the brine at 6. After 4 hours, the spent brine is removed from the tank through the meshes. The ion exchange particles form a settled bed in the column. The ion exchange particles are washed continuously with water, which flows through the column to efficiently remove residual brine from the ion exchange particles. After washing, the residual wash water is drained from the bottom of the column through the mesh, leaving a moist bed of the ion exchange particles at the bottom of the column with minimal entrainment of brine and minimal entrainment of water.

The lithiated material is then treated again with acid to yield lithium in solution as described previously. The cycle of protonation and lithiation is repeated to extract lithium from the brine and yield a lithium sulfate solution. Degradation of the ion exchange particles is limited due to the coating providing a protective barrier.

Example 11: Ion Exchange Reactor with Attached Column and Fluidizing Pump

Lithium is extracted from a brine using ion exchange particles. The brine is an aqueous chloride solution containing 60,000 mg/L Ca, 100 ppm Li, and other species including Na, Mg, and B. The coated ion exchange particles are comprised of an active ion exchange material and a polymer coating. The particles have a mean diameter of 30 microns.

Figure 11:
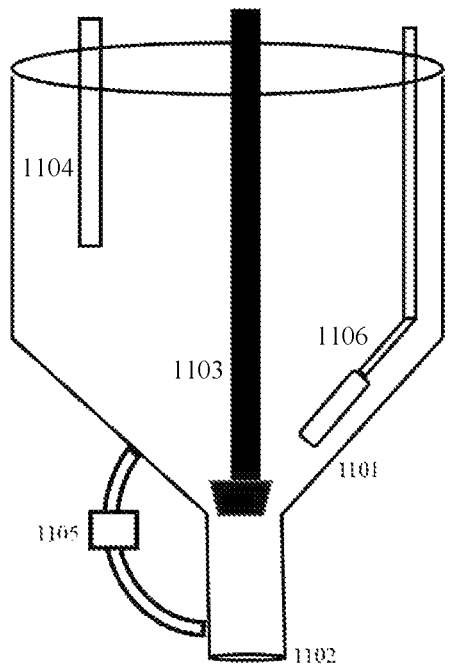
FIG. 11 illustrates and ion exchange reactor comprising a stirred tank having a partial conical shape ending in a thinner cylindrical column with one or more filters inside the tank and a pumping unit to pump liquid out of the tank and back into the bottom of the thinner cylindrical column.

The ion exchange particles are loaded into an ion exchange reactor shown in FIG. 11. The ion exchange reactor comprises a cone-bottom tank with a thinner cylindrical column connected and mounted at the bottom of the cone-bottom tank (1101), a polymer-coated steel mesh with a 5 micron pore size mounted at the bottom of the column (1102) to allow fluid to be pumped into and out of the tank through the mesh while the ion exchange particles are retained inside the tank, an overhead stirrer (1103), a pH controller (1104), a pumping unit to pump liquid out of the tank and back into the bottom of the column (1105) where the inlets and outlets of the pumping unit are covered with a polymer-coated steel mesh with a 5 micron pore size, an internal filter comprising a polymer-coated steel mesh with a 5 micron pore size (1106), and a spraying system (not shown) at the top of the tank with one or more nozzles positioned to spray water to wash ion exchange particles off the sides of the tank and down to the bottom of the tank.

The particles are loaded into the tank as a dry material. 1.0 N hydrochloric acid is pumped into the tank and stirred with the ion exchange particle to yield a lithium chloride eluate solution. During acid treatment, the particles absorb hydrogen while releasing lithium. After 10 minutes, the eluate solution is collected from the tank through the mesh, dewatered, purified using sodium carbonate precipitation and resin ion exchange beads to remove trace Mg/Ca, and processed into lithium carbonate through addition of sodium carbonate solution at 90 degrees Celsius.

After treatment in acid, the protonated particles are treated with brine wherein the particles absorb lithium while releasing hydrogen. The brine is pumped into the tank and stirred with the ion exchange particles. While the tank is stirred, brine is pumped from the tank with the pumping unit and injected at the bottom of the column to fluidize any particles that settle in the column and suspend the particles in the brine which is stirring in the tank. The particles are converted from a protonated state to a lithiated state with a lithium-enriched composition. An aqueous slurry of $Ca(OH)_2$ is added to the tank to maintain the pH of the brine at 6. After 3 hours, the spent brine is removed from the tank through the meshes. The ion exchange particles form a settled bed in the column. The ion exchange particles are washed continuously with water, which flows through the column to efficiently remove residual brine from the ion exchange particles. After washing, the residual wash water is drained from the bottom of the column through the meshes, leaving a moist bed of the ion exchange particles at the bottom of the column with minimal entrainment of brine and minimal entrainment of water.

The lithiated material is then treated again with acid to yield lithium in solution as described previously. The cycle of protonation and lithiation is repeated to extract lithium from the brine and yield a lithium chloride solution. Degradation of the ion exchange particles is limited due to the coating providing a protective barrier.

Example 12: Ion Exchange Reactor with Fluidizing Pump

Lithium is extracted from a brine using coated ion exchange particles. The brine is an aqueous solution containing 100,000 mg/L Na and 500 ppm Li. The coated ion exchange particles are comprised of an ion exchange material and a coating material. The ion exchange material is $Li_4Ti_5O_{12}$ and the coating material is $TiO_2$. The particles are comprised of 90 wt. % active material and 10 wt. % of coating material. The particles have a mean diameter of 80 microns. The particles are created by first synthesizing $Li_4Ti_5O_{12}$ and then the coating is deposited onto the surface of the $Li_4Ti_5O_{12}$ material.

Figure 12:
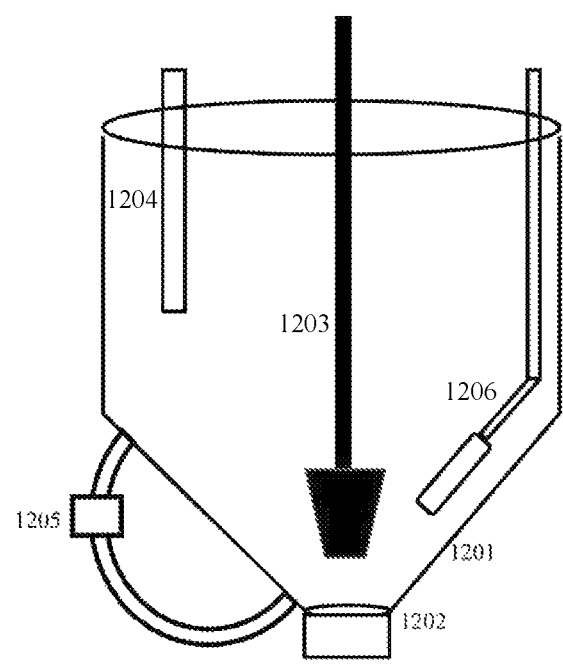
FIG. 12 illustrates an ion exchange reactor comprising a stirred tank having a partial conical shape with one or more filters inside the tank and a pumping unit to pump liquid out of the tank and back into the bottom of the thinner cylindrical column.

The ion exchange particles are loaded into an ion exchange reactor shown in FIG. 12. The ion exchange reactor comprised a cone-bottom tank (1201), a polyetheretherketone 35 micron pore size mesh mounted at the bottom of the cone-bottom of the tank (1202) to allow fluid to be pumped into and out of the tank through the mesh while the ion exchange particles are retained inside the tank, an overhead stirrer (1203), a pH controller (1204), an internal filter comprising a polyetheretherketone 35 micron pore size mesh (1206), a pumping unit to pump liquid out of the tank and back into the bottom of the tank (1205) where the inlets and outlets of the pumping unit are covered with a polyetheretherketone 35 micron pore size mesh, and a spraying system (not shown) at the top of the tank with one or more nozzles positioned to spray water to wash ion exchange particles off the sides of the tank and down to the bottom of the tank.

The particles are loaded into the tank as a dry material. 1.5 N HCl acid is pumped into the tank and stirred with the ion exchange particle to yield a LiCl eluate solution. During acid treatment, the particles absorb hydrogen while releasing lithium. The $Li_4Ti_5O_{12}$ active material is converted to a protonated state with a hydrogen-enriched composition. The coating allows diffusion of hydrogen and lithium respectively to and from the active material while providing a protective barrier that protects the active material. After 15 minutes, the eluate solution is collected from the tank through the meshes, dewatered, purified using sodium carbonate precipitation and resin ion exchange beads to remove trace Mg/Ca, and processed into lithium carbonate through addition of sodium carbonate solution at 90 degrees Celsius.

After treatment in acid, the protonated particles are treated with brine wherein the particles absorb lithium while releasing hydrogen. The brine is pumped into the tank and stirred with the ion exchange particles, and the particles are converted from a protonated state to a lithiated state with a lithium-enriched composition. An aqueous solution of NaOH is added to the tank to maintain the pH of the brine at 6. After 4 hours, the spent brine is removed from the tank through the meshes. The ion exchange particles are then washed with water through the spraying system. The particles are washed three times with water, and the water is drained from the tank through the meshes, leaving a moist bed of the ion exchange particles at the bottom of the tank with low water content.

The lithiated material is then treated again with acid to yield lithium in solution as described previously. The cycle of protonation and lithiation is repeated to extract lithium from the brine and yield a LiCl solution. Degradation of the ion exchange particles is limited due to the coating providing a protective barrier. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein is optionally employed in practicing the invention. It is intended that the following claims define the scope of the invention and that methods and structures within the scope of these claims and their equivalents be covered thereby.

What is claimed is:

1. A method for extracting lithium from a liquid resource, comprising:
    a) providing an ion exchange reactor comprising one or more particle traps;
    b) providing ion exchange particles in said ion exchange reactor;
    c) contacting said ion exchange particles in said ion exchange reactor with said liquid resource, wherein hydrogen ions from said ion exchange particles are exchanged with lithium ions from said liquid resource to produce lithium-enriched ion exchange particles in said ion exchange reactor;
    d) removing said liquid resource from said ion exchange reactor while retaining said ion exchange particles in said ion exchange reactor using said one or more particle traps;
    e) treating said lithium-enriched ion exchange particles with an acid solution, wherein said lithium ions from said lithium-enriched ion exchange particles are exchanged with hydrogen ions from said acid solution to produce a lithium eluate solution; and
    f) removing said lithium eluate solution from said ion exchange reactor while retaining said ion exchange particles in said ion exchange reactor using said one or more particle traps;
wherein said one or more particle traps comprise one or more filters, and wherein said one or more filters comprise a belt filter, a filter press, a pressure vessel containing filter elements, a rotary drum filter, a rotary disc filter, a centrifugal filter with a fixed or moving bed, a perforated basket centrifuge, a three-point centrifuge, a peeler type centrifuge, or a pusher centrifuge.

2. The method of claim 1, further comprising washing said lithium-enriched ion exchange particles with a water solution one or more times after step d) and removing said water solution from said ion exchange reactor while retaining said ion exchange particles in said ion exchange reactor using said one or more particle traps before step e).

3. The method of claim 2, wherein removing said water solution from said ion exchange reactor comprises using the one or more particle traps to separate the ion exchange particles and the water solution.

4. The method of claim 1, wherein said one or more filters comprise a belt filter, a filter press, a pressure vessel containing filter elements, a rotary drum filter, or a rotary disc filter.

5. The method of claim 1, wherein said one or more filters comprise a centrifugal filter with a fixed or moving bed, a perforated basket centrifuge, a three-point centrifuge, a peeler type centrifuge, or a pusher centrifuge.

6. The method of claim 1, wherein said one or more filters comprise a filter press.

7. The method of claim 1, wherein the one or more particle traps comprise one or more meshes, and wherein the liquid resource moves through the one or more meshes to contact the ion exchange particles in the ion exchange reactor.

8. The method of claim 1, wherein removing said liquid resource from said ion exchange reactor comprises using the one or more particle traps to separate the ion exchange particles and the liquid resource.

9. The method of claim 1, wherein removing said lithium eluate solution from said ion exchange reactor comprises using the one or more particle traps to separate the ion exchange particles and the lithium eluate solution.

10. The method of claim 1, wherein the ion exchange particles form a packed bed, a settled bed, a fluidized bed, or combinations thereof.

11. The method of claim 1, wherein the acid solution comprises hydrochloric acid, sulfuric acid, nitric acid, phosphoric acid, or combinations thereof.

12. The method of claim 1, wherein the lithium eluate solution comprises lithium chloride, lithium sulfate, lithium nitrate, or other lithium salts.

13. The method of claim 1, wherein removing said liquid resource from said ion exchange reactor or removing said lithium eluate solution from said ion exchange reactor comprises applying a vacuum to the one or more filters when the one or more filters are in contact with the ion exchange particles.

14. The method of claim 1, wherein removing said liquid resource from said ion exchange reactor or removing said lithium eluate solution from said ion exchange reactor comprises pressurizing the ion exchange reactor.

15. The method of claim 1, wherein the ion exchange reactor is a networked plurality of ion exchange reactors; and retaining said ion exchange particles in said ion exchange reactor consists of retaining said ion exchange particles in said networked plurality of ion exchange reactors.

16. The method of claim 15, wherein the networked plurality of ion exchange reactors are networked in series.

17. The method of claim 15, wherein the networked plurality of ion exchange reactors are networked in parallel.

18. The method of claim 1, further comprising processing the lithium eluate solution to provide a lithium chemical; wherein the lithium chemical comprises lithium sulfate, lithium chloride, lithium carbonate, lithium phosphate, lithium hydroxide, lithium metal oxide, lithium metal phosphate, lithium sulfide, or combinations thereof.

19. The method of claim 18, wherein the lithium chemical comprises lithium sulfate, lithium chloride, lithium carbonate, lithium phosphate, lithium hydroxide, or combinations thereof.

20. The method of claim 18, wherein the lithium chemical comprises lithium sulfate.

21. The method of claim 18, wherein the lithium chemical comprises lithium carbonate.

22. The method of claim 18, wherein the lithium chemical comprises lithium phosphate.

23. The method of claim 18, wherein the lithium chemical comprises lithium hydroxide.

24. The method of claim 18, wherein the lithium chemical is solid, aqueous, liquid, slurry form, hydrated, or anhydrous.

25. The method of claim 18, wherein processing the lithium eluate solution comprises acid recovery, acid recycling, acid regeneration, distillation, reverse osmosis, evaporation, purification, chemical precipitation, membrane electrolysis, or combinations thereof.

26. The method of claim 25, wherein processing the lithium eluate solution comprises purification, chemical precipitation, evaporation, membrane electrolysis, or combinations thereof.

27. The method of claim 25, wherein chemical precipitation comprises addition of sodium carbonate to the lithium eluate solution.

28. The method of claim 25, wherein purification comprises contacting resin ion exchange beads to the lithium eluate solution.

29. The method of claim 25, wherein membrane electrolysis generates the lithium chemical in the lithium eluate solution.

* * * * *

UNITED STATES PATENT AND TRADEMARK OFFICE
CERTIFICATE OF CORRECTION

| | | |
|---|---|---|
| PATENT NO. | : 11,975,317 B2 | |
| APPLICATION NO. | : 18/477278 | |
| DATED | : May 7, 2024 | |
| INVENTOR(S) | : David Henry Snydacker et al. | |

It is certified that error appears in the above-identified patent and that said Letters Patent is hereby corrected as shown below:

On the Title Page

At item (63), please replace:
"Pat. No. 11,826,747."
With:
-- Pat. No. 11,865,531. --

Signed and Sealed this
Tenth Day of September, 2024

Katherine Kelly Vidal
*Director of the United States Patent and Trademark Office*